United States Patent [19]

Prammer

[11] Patent Number: 5,652,827
[45] Date of Patent: Jul. 29, 1997

[54] IDENTIFYING AN OBJECT BY FAST AND ROBUST SIGNAL PROCESSING

[75] Inventor: Manfred G. Prammer, West Chester, Pa.

[73] Assignee: The Trustees of the University of Pennsylvania, Philadelphia, Pa.

[21] Appl. No.: 523,739

[22] Filed: Sep. 5, 1995

Related U.S. Application Data

[63] Continuation of Ser. No. 345,014, Nov. 23, 1994, abandoned, which is a continuation of Ser. No. 188,642, Jan. 25, 1994, abandoned, which is a continuation of Ser. No. 792,148, Nov. 8, 1991, abandoned.

[51] Int. Cl.⁶ .................................. G10L 3/02; G10L 9/00
[52] U.S. Cl. ......................... 395/2.12; 395/2.13; 395/2.78
[58] Field of Search ............................... 381/40–42, 51, 381/43; 395/2, 2.1, 2.12–2.13, 2.67, 2.78

[56] References Cited

U.S. PATENT DOCUMENTS 5,027,408  6/1991  Klocker et al. ...................... 381/43

OTHER PUBLICATIONS

S. Lawrence Marple, Jr., *Digital Spectral Analysis with Applications*, Chapter 11, pp. 303–349 (1987).

K. Steiglitz and B. Dickinson, "Phase Unwrapping by Factorization", *IEEE Transactions on Acoustics, Speech, and Signal Processing*, vol. Ass. P–30, No. 6 (Dec. 1982).

C. Lanczos, "An Iteration Method for the Solution for the Eigenvalue Problem of Linear Differential and Intergral Operations," *J. Res. Nat. Bur. Stand*. 45, vol. 4, pp. 255–283 (Oct. 1950).

J. Cullum and R. A. Willoughby, "A Practical Procedure for Computing Eigenmodes of Large, Sparse, Nonsymmetrical Matrices", *Large Scale Eigenvalue Problems*, North–Holland, pp. 193–240 (1986).

H.S. Wilf, *Mathematics for the Physical Sciences*, pp. 18–27, and 83–107.

W.H. Press, B. P. Flannery, S. A. Teukolsky, and W.T. Vetterling, *Numerical Recipes. The Art of Scientific Computing* (FORTRAN Version), Cambridge: Cambridge University Press (1989).

J.H. Wilkinson and C. Reinsch, *Handbook for Automatic Computation*, vol. II: *Linear Algebra*, New York: Springer Verlag (1971).

*Primary Examiner*—David K. Moore
*Assistant Examiner*—Tariq R. Hafiz
*Attorney, Agent, or Firm*—Duane Morris & Heckscher

[57] ABSTRACT

Systems and methods for identifying objects which emit signals. Systems and methods described herein utilize fast signal processing techniques which exploit the stable root structure of a signal and extract the eigenvalue of a matrix having a characteristic polynomial which is approximated from an energy spectrum from the object. A method of analyzing a signal gathered from a signal source wherein the signal is composed of at least one signal of interest and random noise signals is carried out by storing a digital representation of the signal on a digital memory associated with a digital computer, constructing a polynomial expression of the signal with the digital computer, constructing from the polynomial expression a matrix having an order, n, wherein the polynomial expression is substantially the characteristic polynomial of the matrix and the matrix is associated therewith at least one eigenvalue which is a root value of the characteristic polynomial, and tridiagonalizing the matrix to obtain a tridiagonalized matrix having the same eigenvalues as the matrix wherein computer processing time to tridiagonalize the matrix is proportional substantially to $N^2$. Systems and methods of signal processing taught herein greatly reduce the time to process the signals, and are reliable for all orders of characteristic polynomials which model the signals.

21 Claims, 13 Drawing Sheets

IDENTIFYING AN OBJECT BY FAST AND ROBUST SIGNAL PROCESSING

This is a continuation application of application Ser. No. 08/345,014, filed Nov. 23, 1994, now abandoned, which is a continuation of application Ser. No. 08/188,642, filed Jan. 25, 1994, now abandoned, which is a continuation of application Ser. No. 07/792,148, filed Nov. 8, 1991, now abandoned.

FIELD OF THE INVENTION

This invention relates generally to methods and apparatus for analyzing a signal gathered from a signal source. More particularly, this invention relates to methods and apparatus for detecting objects utilizing fast signal processing techniques.

BACKGROUND OF THE INVENTION

Virtually all dynamic systems can be modeled so that signal processing techniques can be applied to the models to extract useful information about the system. Many diverse signal processing techniques have been developed with an eye towards ever increasing the speed of signal extraction, and increasing the ability to deal with many different kinds of signals, some of which when modeled are not well behaved.

Signal processing systems and methods find wide application in a plethora of fields and industries. Magnetic resonance imaging (MRI), radar and sonar imaging, medical imaging, surface science and electronics, non-destructive testing, sensor applications, ultrasound, acoustical reception, geophysics, and other fields all use some form of signal processing to analyze signals gathered from a signal source which are then further conditioned to be operated upon by a signal processing system having appropriate means to process the data. It will be recognized by those with skill in the art that signal processing routines are usually accomplished on standard digital computers which are interfaced to a data gathering system or data input system that provides the signal information to the computer for analysis.

Signal processing methods which have heretofore been developed can be generally broken down into the following discrete steps: gathering signal data from a source or object under examination, converting the signal data to a form usable by a digital computer, inputting the converted data to a digital computer for analysis, and operating on the converted data with a particular data processing method which characterizes the data to the desired appropriate form. The data from the source may be input in many different ways such as, for example, an energy spectrum, a dispersion relationship, an intensity spectrum, or an amplitude versus frequency plot. Whatever the form of the data input to the computer, the basic step of operating on the data according to a particular signal processing method is always performed to produce meaningful output information about the object or source.

There are probably as many signal processing techniques as there are signals to be analyzed. Those skilled in the art will be readily familiar with the fast Fourier transform, the LaPlace transform, and many different numerical techniques which qualify as signal processing methods. A very useful class of signal processing methods requires that the signal received be first approximated to an n-th order linear difference equation. Signal processing systems which utilize such an approximation require that signal information be modeled as a system function which is a ratio of polynomials and which can be completely determined by the pole-zero distribution of the system function in the complex plane. When the signal of interest gathered from the signal source or object to be identified involves noise signals, the problem of detecting possibly damped, sinusoidal signals in the noise involves very high degree polynomials which are usually derived by fitting a linear recursion sequence to the signal samples or to estimated autocorrelation samples.

In this situation, the polynomial's degree is typically one-quarter to one-half the number of sample points, and so polynomial orders of several hundred are common. The polynomial coefficients are generally small, indicating well-conditioned polynomials, that is small perturbations in the coefficients cause similar small changes in the root locations in the complex plane. In the past, polynomial coefficients have been derived from noisy data, and small measurement errors by the data gathering devices do not change the underlying system response in a drastic manner. In these types of systems, the roots of the polynomials are usually evenly distributed in angles close to the unit circle which is a plot of the roots in the complex plane, although it is possible that a few of the roots may substantially deviate from the modulus one of the circle. Sinusoidal components of the signal are derived by identifying the signal roots, and spurious non-signal roots are considered as an autoregressive approximation to the noise in the signal.

There are many ways to characterize a signal as an n-th order linear difference equation. One of the most common techniques for approximating a signal as a linear difference equation is to apply Prony's method to the signal. See, e.g., S. Lawrence Marple, Jr., *Digital Spectral Analysis with Applications*, Chapter 11, pp. 303–349 (1987), the teachings of which are specifically incorporated herein by reference. Prony's methods fits a deterministic exponential model to the data to obtain a spectral interpretation of the energy spectral density. According to Prony's method when as many data samples are used as there are exponential parameters, an exact exponential fit to the data may be made. This relationship can be expressed as follows:

$$x[n] = \sum_{k=1}^{p} h_k z_k^{n-1}. \tag{1}$$

There are thus p equations in Equation 1 wherein $1 < n < p$, which can be expressed in matrix format as:

$$\begin{bmatrix} z_1^0 & z_2^0 & \cdots & z_p^0 \\ z_1^1 & z_2^1 & \cdots & z_p^1 \\ \vdots & \vdots & & \vdots \\ z_1^{p-1} & z_2^{p-1} & \cdots & z_p^{p-1} \end{bmatrix} \begin{bmatrix} h_1 \\ h_2 \\ \vdots \\ h_p \end{bmatrix} = \begin{bmatrix} x[1] \\ x[2] \\ \vdots \\ x[p] \end{bmatrix}. \tag{2}$$

This matrix represents a set of linear simultaneous equations that can be solved for an unknown vector of complex amplitudes.

According to Equation 1, it is apparent that a solution to some homogeneous linear constant coefficient difference equation may be found. In order to find this difference equation, it is desired to define a polynomial $\phi(z)$ that has $z_k$ exponents as its roots, which may be expressed as:

$$\phi(z) = \prod_{k=1}^{p} (z - z_k). \tag{3}$$

Equation 3 can be expanded into a power series so that the polynomial can be represented in a summation such as:

$$\phi(z) = \sum_{m=0}^{p} a[m] z^{p-m}. \qquad (4)$$

Equation 4 has complex coefficients a[m] such that a[o] equals one. The polynomial in Equation 4 is generally denoted as a "characteristic equation" associated with the linear difference equation.

Prony's method requires fitting p exponentials to 2p data samples and can be summarized in three steps. The first step is to obtain the polynomial coefficients associated with Equation 4. The second step is to calculate the roots of the polynomial which are defined by Equation 4. Many types of polynomial factoring routines have been devised to perform this second step such as, for example, the CPOLY computer program taught in the above-referenced Marple text. In calculating the roots of the polynomial, a damping coefficient, $\alpha_i$, and a sinusoidal frequency $f_i$, are determined from the roots $z_i$ of Equation 4 after index shifting and coefficient substitutions for convenience using the relationships:

$$\alpha_i = \ln|z_i|/T \text{ sec}^{-1} \qquad (5)$$

$$f_i = \tan^{-1}[\text{Im}\{z_i\}]/\text{Re}\{z_i\} 2\pi T \text{ Hz} \qquad (6)$$

To complete Prony's procedure, the roots so computed are used to construct the matrix of elements which can then be solved for the p complex parameters h[1], . . . h[p] of Equation 2. The amplitude $A_i$ and the initial phase $\theta_i$ may be determined from each $h_i$ parameter, according to the relationships:

$$A_i = |h_i| \qquad (7)$$

and, $$\theta_i = \tan^{-1}[\text{Im}\{h_i\}/\text{Re}\{h_i\}] \text{ radians} \qquad (8)$$

The foregoing explanation of the generalized Prony's method assumes that the number of data points, N, does not exceed the minimum number needed to fit a model of p exponentials, that is, N is greater than 2p. However, in the real world the number of data points usually exceeds the minimum number, and the system is then said to be "overdetermined." In such a case, it has been necessary to approximate numerically the polynomial roots. Numerical factorization schemes of a very high degree of well-conditioned polynomials have been developed to accomplish signal processing in this situation. See, e.g., K. Steiglitz and B. Dickinson, "Phase Unwrapping by Factorization", *IEEE Transactions on Acoustics, Speech, and Signal Processing*, Vol. Ass. P-30, No. 6 (December 1982), the teaching of which are specifically incorporated herein by reference. Other numerical schemes have been developed with an eye towards solving massive root polynomials.

While these numerical techniques have proven themselves useful for certain signal processing problems, numerical determination of polynomial roots is a difficult problem at high values of order n. Search techniques based on Newton-Raphson iterations often encounter numerical overflow or underflow of the high order polynomials and their derivatives everywhere except in the vicinity of the unit circle, thereby creating errors in the root solutions. Root solving techniques generally resort to "deflation," which is the process of repeatedly dividing the polynomial by the roots that these techniques can locate. Deflation tends to produce generally ill-conditioned intermediate polynomials having a huge dynamic range in their coefficients. The deflated polynomials can exhibit chaotic behavior, wherein small errors in the coefficients cause massive shifts in the root positions, thereby also producing spurious root results.

In the worst case scenario, errors in deflated polynomials that are accumulated during deflation will leave the final polynomials, which would normally contain the actual signal roots, without useful precision. Root polishing techniques which have been employed in conjunction with deflation methods may recover some of the precision, but are generally defeated by the inability to evaluate the original polynomial in a sufficiently large convergence area around a root which is far from the unit circle.

Other numerical techniques have been developed and employed to approximate and model systems in light of these problems. For example, least squares analyses have been used with Prony's method of approximating a signal spectrum, and the aforementioned phase unwrapping by factorization according to the Steiglitz et al. article has also been developed. These numerical techniques, and others, are available for approximating solutions to the linear difference equation constants.

However, a basic problem inherent in all the numerical methods mentioned above is encountered when determining the coefficients of a polynomial with a digital computer having appropriate software, that is, the problem of overflow and underflow of computer registers which invariably occurs during processing of the computer software associated with the methods. Consider the simple case of a polynomial of order 200, $P(z)=z^{200}-1$. Using Digital Equipment Company's VAX d-float format having a 55-bit mantissa and an 8-bit exponent, the CPOLY root solver taught in the Marple text returns serious errors in 15 percent of the root positions on the unit circle. Furthermore, using the search-deflate-polish technique with a worst case intermediate-order polynomial of N=100 where roots lie in one complex half-plane, with a 106-place mantissa representation of the roots approximately one-half of the mantissa is lost in d-float format. Extending precision defers this problem to higher orders without resolving the overflow and underflow problems. Standard software implementations of CPOLY thus usually limit the acceptable polynomial order to n=50, for example. This problem is inherent in virtually every prior numerical-type signal processing method or system.

Therefore, prior numerical techniques for calculating the coefficients of a polynomial to perform signal processing simply fail with polynomials of order greater than about 50. While the above-referenced techniques of signal processing perform nominally for limited applications, it is desirable to develop new methods and systems of signal processing which provide highly accurate root solutions of characteristic polynomials, provide accurate calculation of polynomial coefficients, and are reliable for high orders. Furthermore, the root solving techniques which are used during object-identification signal processing methods should be easily implementable on standard, digital computers and adaptable for many types of signals and signal processing applications. The prior numerical techniques referenced above simply do not satisfy these criteria.

SUMMARY OF THE INVENTION

There is a long-felt need in the art recognized by the inventor of the subject matter taught and claimed herein for signal processing techniques and devices which efficiently utilize computer time, and accurately identify objects which emit a signal. Signal processing systems and methods in accordance with the present invention solve this long-felt-need and the other problems which are discussed above.

In accordance with the present invention, methods of analyzing a signal gathered from a signal source wherein the signal is composed of at least one signal of interest and random noise signals are provided. The methods preferably comprise the steps of storing a digital representation of the signal in a digital memory associated with a digital computer, constructing a polynomial expression of the signal with the digital computer, constructing from the polynomial expression a matrix having an order, n, wherein the polynomial expression is substantially the characteristic polynomial of the matrix and the matrix has associated therewith at least one eigenvalue which is a root value of the characteristic polynomial, and tridiagonalizing the matrix to obtain a tridiagonalized matrix having the same eigenvalues as the matrix wherein processing time to tridiagonalize the matrix is proportional substantially to about $n^2$.

Identification systems are further provided in accordance with the present invention. In a further preferred embodiment, an identification system in accordance with the invention comprises data gathering means for gathering data about an object to be identified by the system, conditioning means adapted to receive the data about the object for conditioning the data to produce conditioned data, processing means adapted to receive the conditioned data for identifying the object from the conditioned data, the processing means further comprising approximation means for approximating the conditioned data to a characteristic polynomial of a matrix having associated therewith at least one eigenvalue, and minimization means interfaced with the approximation means for minimizing the matrix to produce a minimized matrix such that extraction of the eigenvalues from the minimized matrix is accomplished in a minimized time which is less than a time of extraction of the eigenvalues from the matrix.

Methods and apparatus for signal processing taught and claimed herein greatly reduce the processing time necessary to identify an object by a digital computer which is utilized in conjunction with the methods. Furthermore, methods of signal processing provided in accordance with the present invention maintain the computational complexity of the signal processing constant, thereby allowing reliable characterization of the polynomial and efficient identification of the object. Factorization of very high order polynomials having regular and stable root structures is easily accomplished since methods provided in accordance with the present invention exploit this stable root structure by solving an associated eigenvalue problem for the gathered signal data. Methods and systems described herein are thus highly useful for the detection of possibly damped, sinusoidal signals in noise by linear prediction, for the numerical evaluation of the complex cepstrum, and for phase unwrapping by factorization.

The advantages of methods and systems provided in accordance with the present invention will be readily understood by reading the following detailed description in conjunction with the drawings.

DETAILED DESCRIPTION OF PREFERRED EMBODIMENTS

Figure 1:
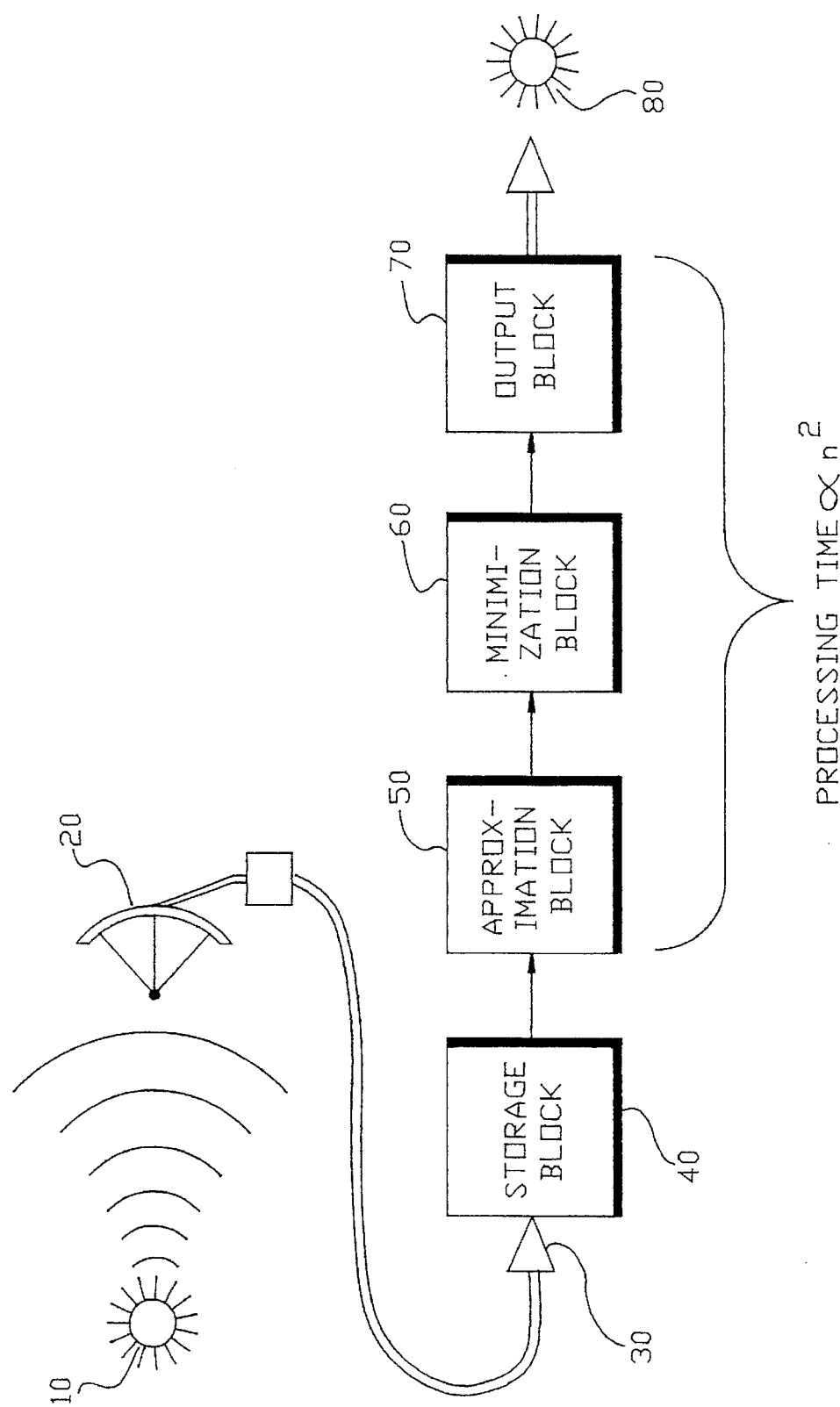
FIG. 1 is a block diagram of a signal processing system adapted to identify an object provided in accordance with the present invention.

Referring now to the drawings wherein like reference numerals refer to like elements, FIG. 1 shows a block diagram of a signal processing system in accordance with the present invention adapted to identify an object shown generally at 10. The object will emit an energy spectrum which may be electromagnetic or acoustic in nature when incident with energy in which case the spectrum will be a reflected energy spectrum or an excited energy spectrum; or an energy spectrum associated with an object that naturally emits an energy spectrum. The object 10 could be for example, an aerospace object which emits an energy spectrum when illuminated with electromagnetic radiation from a radar, or which has an active radar which also emits energy.

Alternatively, object 10 could be a phosphorous ion in a human body emitting an energy spectrum centered around about 26 MHz, which can be detected in a MRI spectroscopic procedure. Object 10 further could be an acoustic object such as a submersed submarine which has an active sonar, or which is being imaged by a sonar device so that the submarine can be identified. Object 10 could also be a geophysical event, for example. Those with skill in the art will recognize that signal processing systems as shown in FIG. 1 may be utilized for identification of these kinds of objects, and others which emit an energy spectrum.

It will be further recognized by those with skill in the art that whatever the nature of the energy spectrum emitted by object 10, data gathering means 20 will be provided to the system for gathering signal data from the object 10 which is to be identified by the system. In general, data gathering means 20 can be any detecting element which has a sensitivity such that the detecting element is responsive to the energy spectrum emitted by the object 10. Thus, data gathering means 20 may be, for example, a microwave antenna element, a printed-circuit antenna element, a MRI coil, a sonar receiving element, a geophone, or any other element and equivalents thereof which have a sensitivity such that the detecting element 20 is responsive to the energy spectrum emitted by the object 10.

In a further preferred embodiment of a signal processing system provided in accordance with the present invention, conditioning means 30 receives signal data about the object 10 from the data gathering element 20 and conditions the signal data to produce conditioned data which is usable by the rest of the system of FIG. 1 which will ultimately process the conditioned data and identify the object 10. The system shown in FIG. 1 is implementable with a digital computer in which case it will be necessary for the signal conditioning means 30 to digitize the signal data received from the data gathering element 20. Therefore in a preferred embodiment, the conditioning means is an analog to digital (A/D) converter which converts the analog signal data received from the data gathering element 20 to a digital representation of the signal emitted by object 10 so that a digitized form of the energy spectrum is constructed by the system which can further be processed to identify the object. Conditioning means 30 may also comprise amplifying elements and other signal conditioning elements in addition to an A/D converter which digitizes the signal for the system.

Since signal processing methods provided in accordance with the present invention will generally be performed with a digital computer to perform data analysis of the energy spectrum emitted by object 10, storage block 40 for storing the digital representation of the signal in a digital memory associated with the digital computer is provided and is interfaced with the A/D converter 30. The storage block 40 having a digital memory can be any type of computer storage mechanism which is adapted to store digital representations of data. Thus storage block 40 could comprise alternatively, or in combination, a random access memory (RAM), a mass media storage device such as a tape and tape drive or disk and disk drive, or any other storage medium and equivalents thereof which is adapted to store digital data.

In a further preferred embodiment of a signal processing system in accordance with the present invention, approximation means 50 is interfaced to the storage block 40. The approximation means is preferably an operation block having appropriate computer hardware for approximating the conditioned data to a characteristic polynomial of a matrix having associated therewith at least one eigenvalue. An "operation block" as used herein means a computer chip or hardware device having appropriate computer instructions to perform a desired function. An operation block could thus be for example, a read only memory (ROM), a programmable ROM (PROM), an erasable PROM (EPROM), a magnetic disk or tape, or any other device and equivalents thereof adapted to store computer commands. Approximation means 50 preferably approximates the conditioned data to a polynomial according to Prony's method as discussed earlier. However, it will be recognized by those with skill in the art that any other method of approximating conditioned data to a polynomial which is factorizable can be utilized in accordance with the present invention.

In a further preferred embodiment, minimization means 60 is also preferably interfaced with the approximation means 50 and is provided to the system for minimizing the matrix to produce a minimized matrix such that extracting the eigenvalues from the minimized matrix can be accomplished. The minimization means 60 is also preferably an operation block of the system having appropriate computer hardware which accomplishes extraction of the eigenvalues in a minimized time which is less than the time which it would take to extract the eigenvalues from the matrix as produced directly by the approximation block 50.

The polynomial constructed by the approximation block 50 from the digitized energy spectrum will have an order, "n". In accordance with the present invention, the minimization block 60 preferably accomplishes extraction of the eigenvalue from the characteristic polynomial produced by approximation block 50 in a processing time substantially proportional to a fraction of about $n^2$ seconds. The extracted eigenvalue is then bussed to an output block 70 which performs final manipulation of data from the minimization block 60 to finally characterize the polynomial and eigenvalue so that an identified object 80 is output by the signal processing system. Output block 70 could be for example, a video display device, chart recorder, oscilloscope or other device which displays data. Output block could also comprise data conditioning hardware which prepares the data to be displayed.

The signal processing system of FIG. 1 will characterize the polynomial, and thus the energy spectrum, very well when the polynomial has a regular and stable root structure and relatively small coefficients. These types of polynomials arise in a variety of signal processing problems, and the robustness of methods provided in accordance with the present invention having a constant processing time proportional to a fraction of about $n^2$ allows the signal processing systems and methods taught herein to find use in a wide variety of signal processing applications.

Figure 2A:
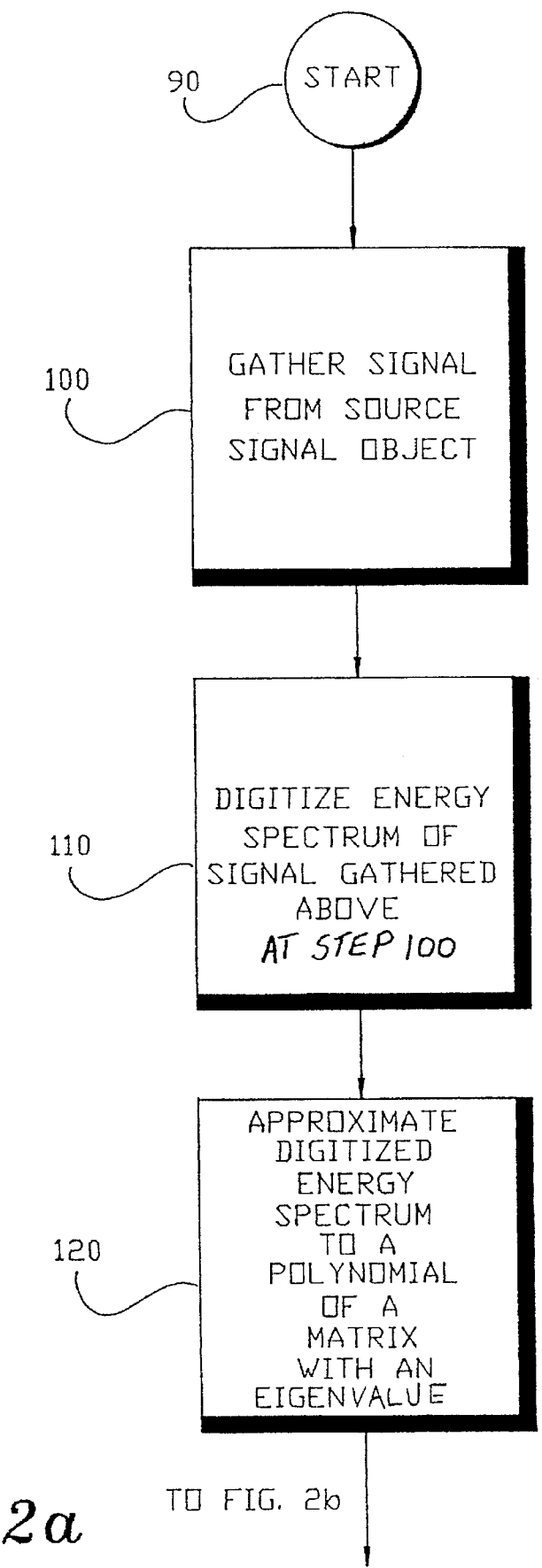
FIGS. 2a and 2b are a flow diagram of a method of signal processing for identifying an object provided in accordance with the present invention.
Figure 2B:
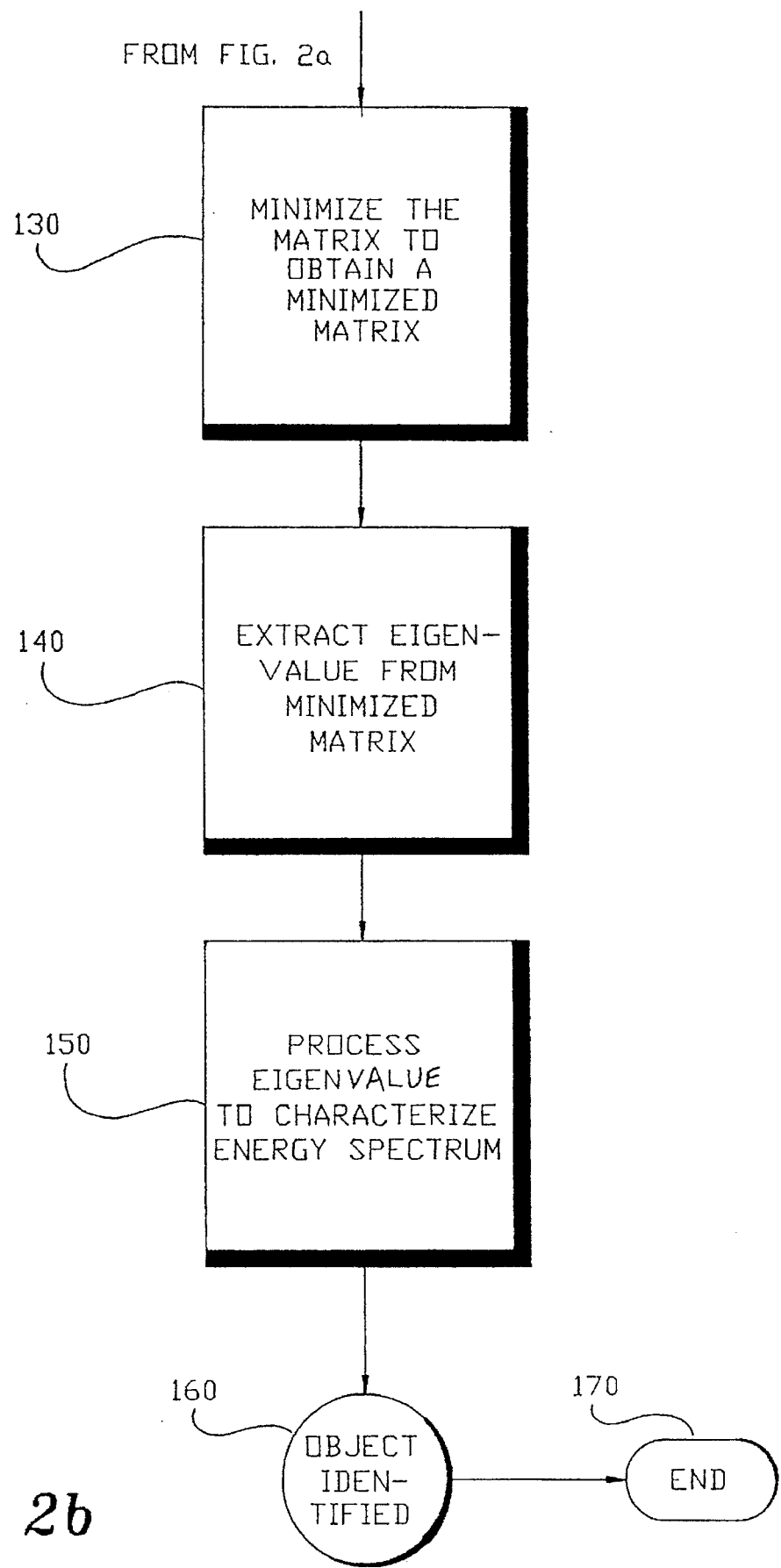
Figure 3:
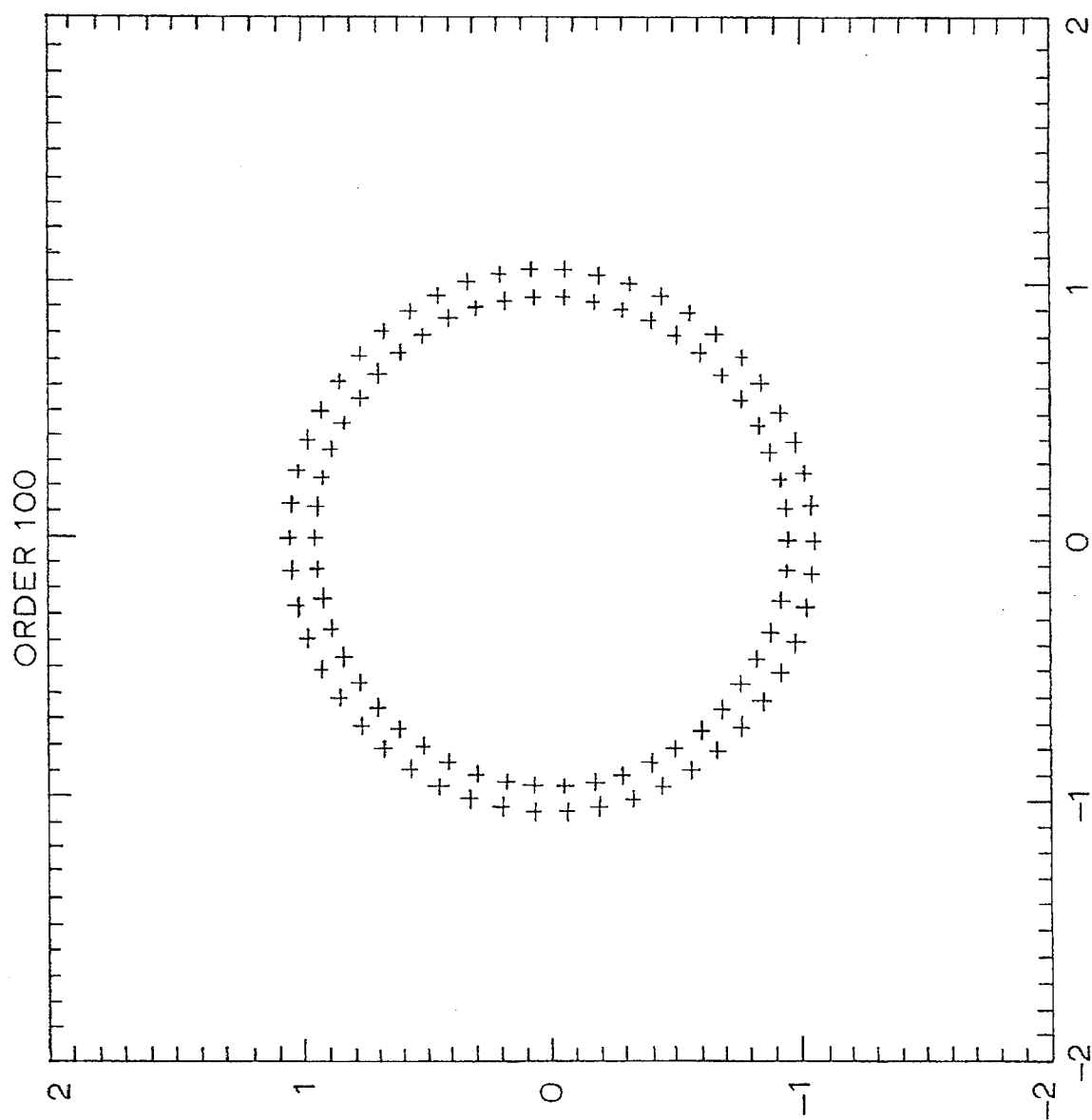
FIG. 3 is a graph of a unit circle for roots of a polynomial of order 100 which were determined according to prior methods of root solving in a prior signal processing system.
Figure 4:
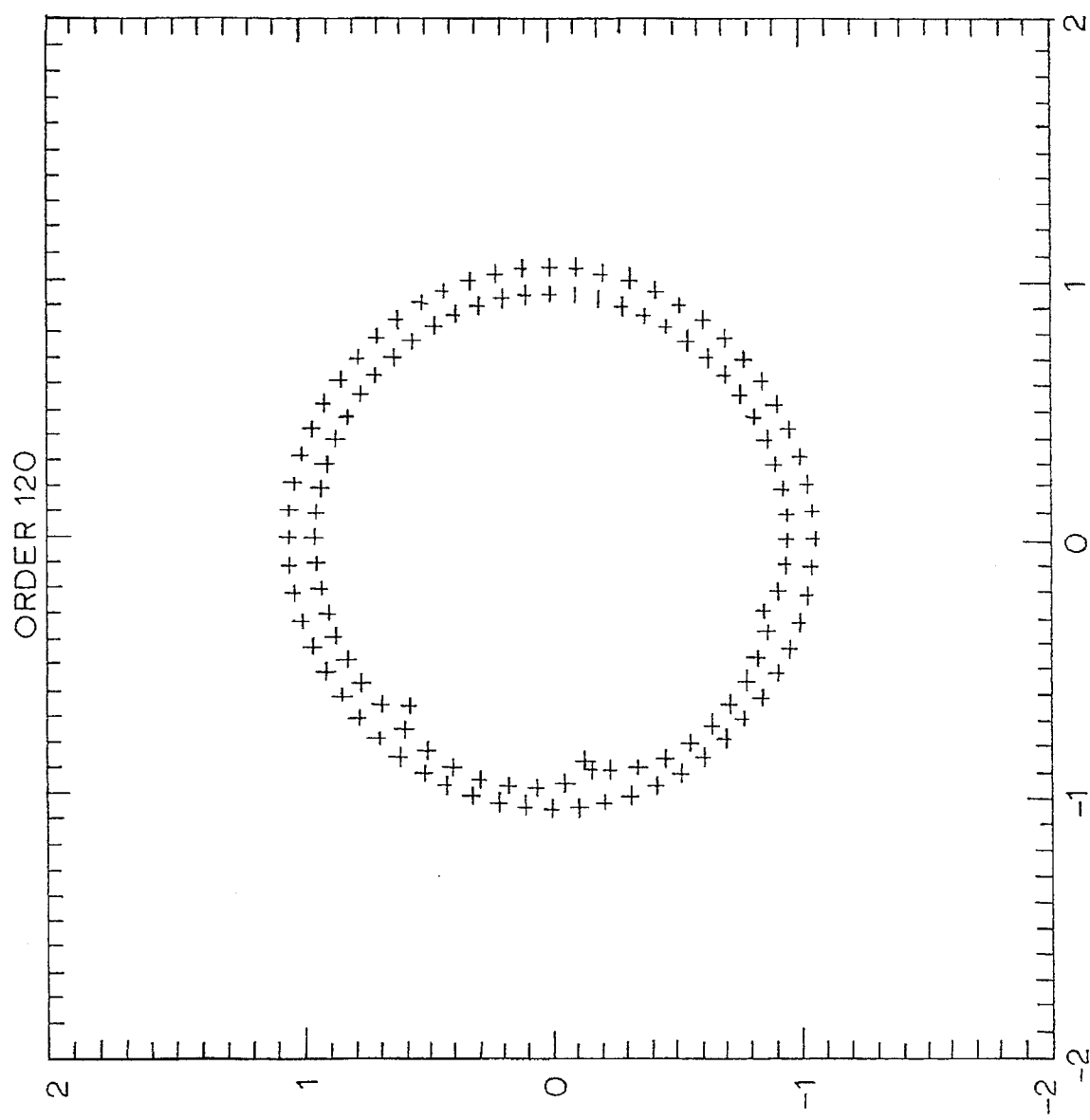
FIG. 4 is a graph of a unit circle for roots of a polynomial of order 120 which were determined according to prior methods of root solving in a prior signal processing system.
Figure 5:
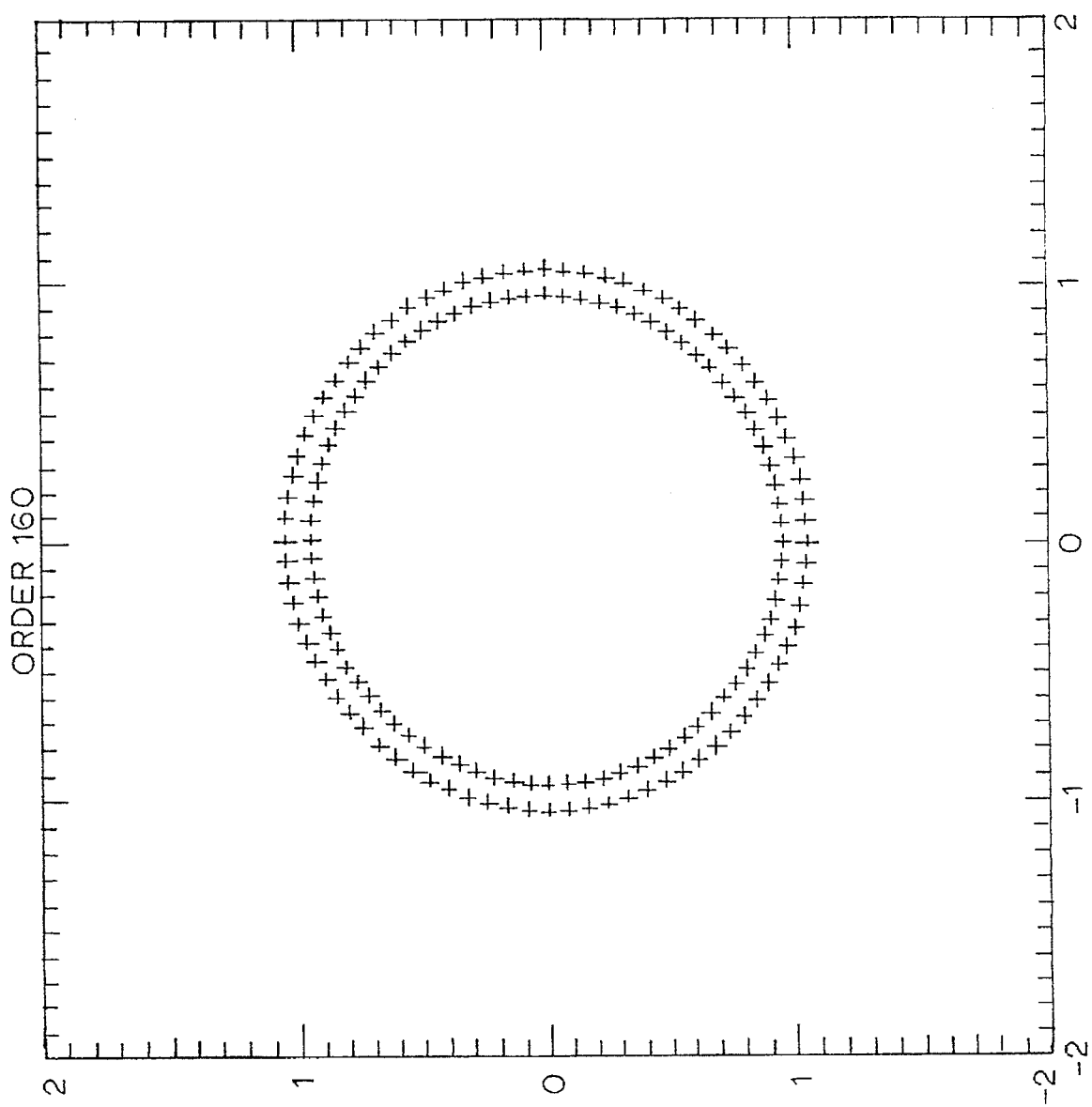
FIG. 5 is a graph of a unit circle for roots of a polynomial of order 160 which were determined according to prior art methods of root solving in a prior signal processing system.
Figure 6:
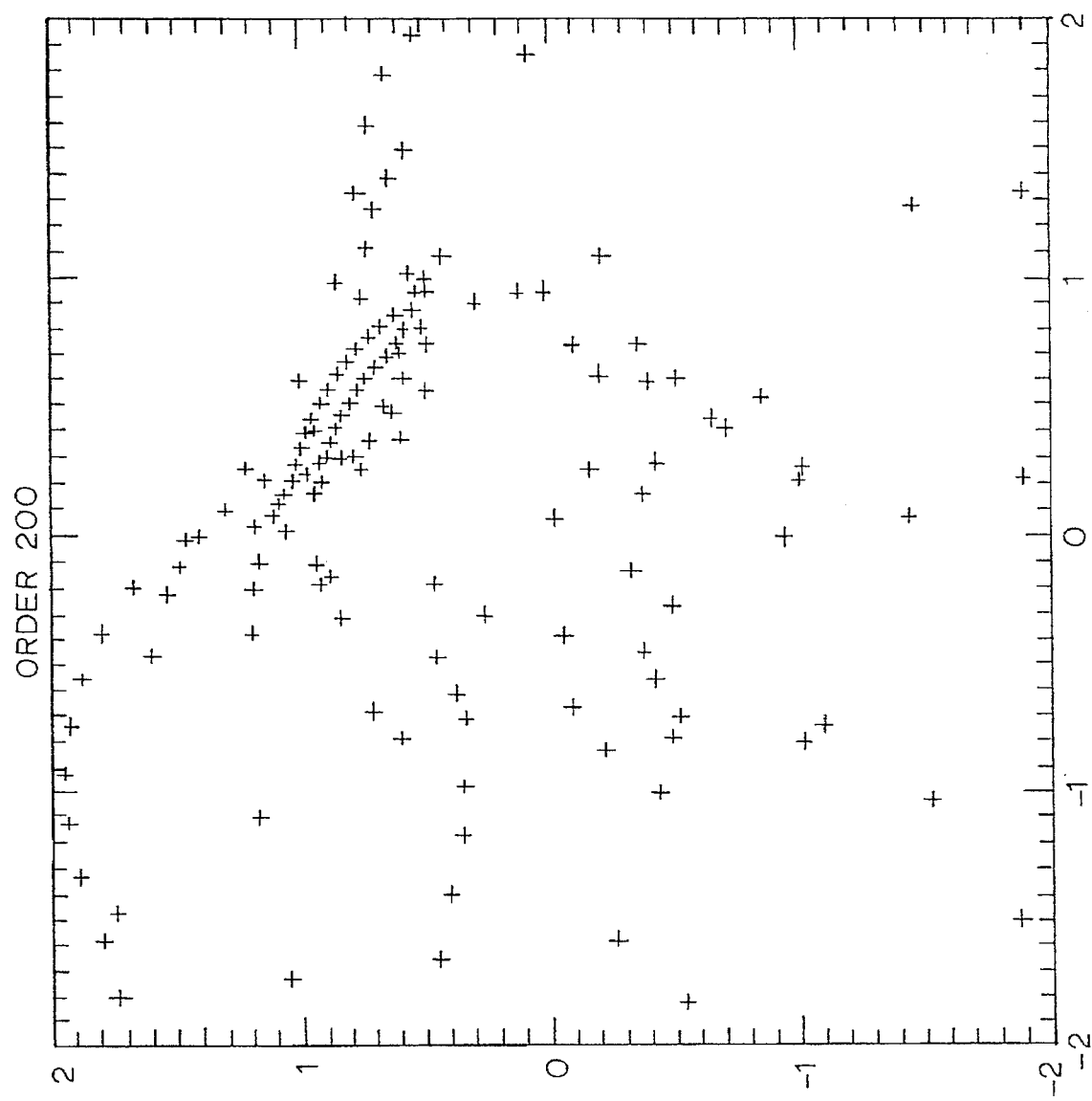
FIG. 6 is a graph of a unit circle for roots of a polynomial of order 200 which were determined according to prior methods of root solving in a prior signal processing system.

FIGS. 2a and 2b are a generalized flow diagram of portions of methods of signal processing in accordance with the present invention which may be implemented in software on a digital computer in a system such as that shown in FIG. 1. The method starts at 90 wherein the system is initialized. At step 100, signals are gathered from the source signal object such as the object shown at 10 in FIG. 1. In a preferred embodiment at step 110, the energy spectrum emitted from the object 10 is digitized, and at step 120 the digitized energy spectrum is approximated to a polynomial of a matrix having at least one eigenvalue.

At step 130 the matrix is minimized to obtain a minimized matrix having the same eigenvalues as the matrix. At step 140, it is preferred to extract the eigenvalues from the minimized matrix, whereupon at step 150 the eigenvalues are processed to characterize the energy spectrum which has been gathered from the signal source.

After the eigenvalues have been processed at step 150, the object is then identified by the signal processing system at step 160. The method of object identification then ends at step 170 and the identified object is output in recognizable form to a user of the system.

In accordance with the methods shown in FIG. 2, after the energy spectrum has been digitized at step 110, it is desirable to factorize the polynomial at step 120 which can be approximated from the digitized energy spectrum. In a preferred embodiment, a unique factorization is sought of the type:

$$P(z) = z^n + \sum_{i=1}^{n} c_i z^{n-i} = \prod_{i=1}^{n} (z - z_i), \tag{9}$$

which is preferably a polynomial obtained according to Prony's method discussed above. The coefficients, $c_i$, may be real or complex, but the roots, $z_i$, are always complex. P(z) is further preferably scaled such that the largest $c_i$ is equal to one.

The polynomial of Equation 9 is stable if the dynamic range in the scale of coefficients does not exceed approximately four orders of magnitude. This assumption holds well for linear prediction polynomials. The roots of Equation 9 can be considered as eigenvalues of an n×n matrix A or its transpose $A^T$. This means that the following relationship holds:

$$A = \begin{bmatrix} -c_1 & -c_2 & \cdots & -c_n \\ 1 & 0 & \cdots & 0 \\ 0 & 1 & \cdots & 0 \\ \vdots & \vdots & & \vdots \\ & & & \end{bmatrix}; \tag{10}$$

$$A^T = \begin{bmatrix} -c_1 & 1 & 0 & \cdots \\ -c_2 & 0 & 1 & \cdots \\ \vdots & \vdots & \vdots & \cdots \\ \vdots & \vdots & \vdots & \cdots \\ -c_n & 0 & 0 & \cdots \end{bmatrix}.$$

It is known by those with skill in the art that computing eigenvalues of large matrices with digital computers requires a large amount of computer time. The matrix A, however, is sparse, and provided that the $|c_i|$ is bounded by one with a limited dynamic range, then A and $A^T$ are considered to be well-conditioned. When these properties apply to the matrix A, the application of Lanczos' technique is possible so that the eigenvalues can be extracted economically and efficiently. This technique is taught in C. Lanczos, "An Iteration Method for the Solution for the Eigenvalue Problem of Linear Differential and Integral Operations," *J. Res. Nat. Bur. Stand.* 45, Vol. 4, pp. 255–283 (October 1950), the teachings of which are specifically incorporated herein by reference.

Applying Lanczos' technique produces a tridiagonal matrix having the same eigenvalues as the matrix A. A modified form of the Lanczos method for tridiagonalizing a matrix is taught in J. Cullum and R. A. Willoughby, "A Practical Procedure for Computing Eigenmodes of Large, Sparse, Nonsymmetrical Matrices", *Large Scale Eigenvalue Problems*, North-Holland, pp. 193–240 (1986), the teachings of which are specifically incorporated herein by reference. In a preferred embodiment, a tridiagonalized matrix is obtained in accordance with the present invention according to the modified Lanczos method taught in the Cullum and Willoughby article. This matrix is defined herein to be a "minimized" matrix since it has the same eigenvalues of matrix A, but it takes a significantly less amount of time to extract the eigenvalues from this minimized matrix with a digital computer than it would from the matrix A with the same computer.

The modified Lanczos method taught herein is accomplished by projecting two vectors, v and w, repeatedly into the row and column vector spaces of A. This is done according to the following mathematical operations:

$$v \leftarrow Av;$$

$$w \leftarrow A^T w \tag{11}$$

These vectors are then preferably bi-orthonormalized according to the following recursion relationships:

$$v_{i+1} = r_{i+1}/\beta_{i+1};$$

$$r_{i+1} = Av_i - \alpha_i v_i - \beta_i v_{i-1};$$

$$w_{i+1} = t_{i+1}/\beta_{i+1};$$

$$t_{i+1} = A^T w_i - \alpha_i w_i - \beta_i w_{i-1}; \tag{12}$$

$$2\alpha_i = w_i^T(Av_i - \beta_1 V_{i-1}) + v_i^T(A^T w_i - \beta_i w_{i-1});$$

$$\beta_{i+1} = \sqrt{r_{i+1}^T t_{i+1}} \;;$$

$$\beta_1 = 0.$$

The vector sets $v_i$ and $w_i$ will comprise a similarity transform when written as column vectors of matrices V and W. Thus, the following similarity transform can be obtained:

$$T = W^T V = V^T A^T W \tag{13}$$

This transform produces a matrix T which is tridiagonal, having identical subdiagonals and superdiagonals and the same eigenvalues as the matrix A. Matrix T is preferably derived from the orthonormalization factors $\alpha_i$ and $\beta_i$, that is:

$$T = \begin{bmatrix} \alpha_1 & \beta_2 & 0 & \cdots \\ \beta_2 & \alpha_2 & \beta_3 & \cdots \\ 0 & \beta_3 & \alpha_3 & \cdots \\ \vdots & \vdots & \vdots & \\ \vdots & \vdots & \vdots & \end{bmatrix}. \tag{14}$$

This bi-orthonormalization as described is preferably accomplished at block 130 in FIG. 2.

As stated at block 140 of FIG. 2, it is then desired to extract the eigenvalues from the minimized matrix T which is a bi-orthonormalized matrix having the same eigenvalues as matrix A. This is preferably accomplished as a final diagonalization of T, and can be performed by a standard decomposition procedure. This produces a triangular matrix, the diagonal elements of which are the roots of the polynomial P(z).

Diagonalization in preferred embodiments can be performed according to a real value routine described in W. H. Press, B. P. Flannery, S. A. Teukolsky, and W. T. Vetterling, *Numerical Recipes. The Art of Scientific Computing (FORTRAN Version)*, Cambridge: Cambridge University Press (1989) the teachings of which are specifically incorporated herein by reference. Aspects of the final diagonalization performed here in preferred embodiments are also taught in J. H. Wilkinson and C. Reinsch, *Handbook for Automatic Computation, Vol. II: Linear Algebra*, New York: Springer Verlag (1971), the teachings of which are also incorporated herein by reference. This method of diagonalization accepts arrays holding the diagonal and subdiagonal elements of the matrix and returns the associated eigenvalues as solutions.

In still further preferred embodiments, when constructing a polynomial which approximates a digitized energy spectrum it is desirable to separate the roots located at the origin which would render the matrix A singular. It is also preferred at step 120 in FIG. 2 to initialize the two random vectors v and w. Vectors v and w are taken from independent uniform distributions in a range from 0 to 1 and normalized such that $v^T w = 1$. The use of independent start vectors has been found to yield significantly improved results and numerical performance.

Use of the modified Lanczos procedure as taught in the Cullum and Willoughby article relieves the problem found in prior methods of signal processing wherein the orthogonality of the vectors does not persist in finite precision arithmetic. In general, the basic Lanczos procedure does not function properly without modification. The modified Lanczos procedure as taught in the Cullum and Willoughby article, along with the speed and proficiency which is generally obtained by using a Lanczos procedure on real symmetric matrices, greatly improves signal processing methods and allows signal processing methods provided in accordance with the present invention to outperform the prior approaches discussed above.

Furthermore, signal processing scientists are aware that a normalizing factor used in coefficient recursion procedures for polynomials may tend to vanish, thereby forcing prior diagonalization procedures to be terminated. Also, roundoff errors caused by finite precision arithmetic destroy the theoretical relationships between the original matrix and the Lanczos matrix which is generated. By using the modified Lanczos procedure according to the Cullum and Willoughby text in a basic two-sided Lanczos recursion, an analog of a stability pivoting block is implemented for the solution of the system of linear equations. Use of the modified Lanczos recursion as taught in the Cullum and Willoughby text allows diagonalization of non-symmetric matrices so that generalized signal processing problems can be addressed by systems and methods provided in accordance with the present invention which can preferably be implemented on a digital computer with appropriate software to perform the methods.

Signal processing methods provided in accordance with the present invention have been compared to other signal processing methods which utilize synthesized polynomials having varying orders and stability. Other signal processing schemes to which the present invention has been compared are of the traditional "search-deflate-polish" type discussed above, and the arithmetic employed in all comparisons was the VAX d-float format.

One of the more widely known prior important signal processing schemes to which the present invention has been compared is the CPOLY root locator heretofore discussed. At low polynomial orders, for example, n<20, substantially all signal processing methods can factor even very badly conditioned polynomials. With these low orders, the CPOLY algorithm factors faster than signal processing methods provided in accordance with the present invention. Furthermore, at intermediate orders, 20<n<80, the CPOLY method has the widest tolerances of all methods for pathological root configurations. However at higher orders, n>80, the CPOLY method is practically useless.

Other root finding techniques often will terminate at high orders without locating all the roots. However, methods of signal processing in accordance with the present invention have performed without noticeable degradation. The treatment of multiple roots is highly advantageous with signal processing methods in accordance with the present invention, and multiple roots can be located up to the m-th root of the machine precision where m is the root's multiplicity, which is the theoretical limit.

Referring now to FIGS. 3, 4, 5 and 6, unit circle plots of the roots of polynomials having orders 100, 120, 160, and 200, respectively, using the CPOLY signal processing method are shown. The "crosses" on the graphs indicate the root locations. It can be seen from these plots that above order 160, the CPOLY method does not produce a unit circle, and breaks down completely when the polynomial has an order higher than 200. These data correspond to a multiplicity of sinusoidal signals with white noise such as that found in a MRI spectrographic energy signal. The CPOLY method was run on an IBM 6000/320 digital computer and for order 100, took approximately 0.5 seconds to complete; for order 120 took approximately 0.71 seconds to complete; for order 160 took approximately 1.62 seconds to complete; and for order 200 took approximately 1.94 seconds to complete.

Figure 7:
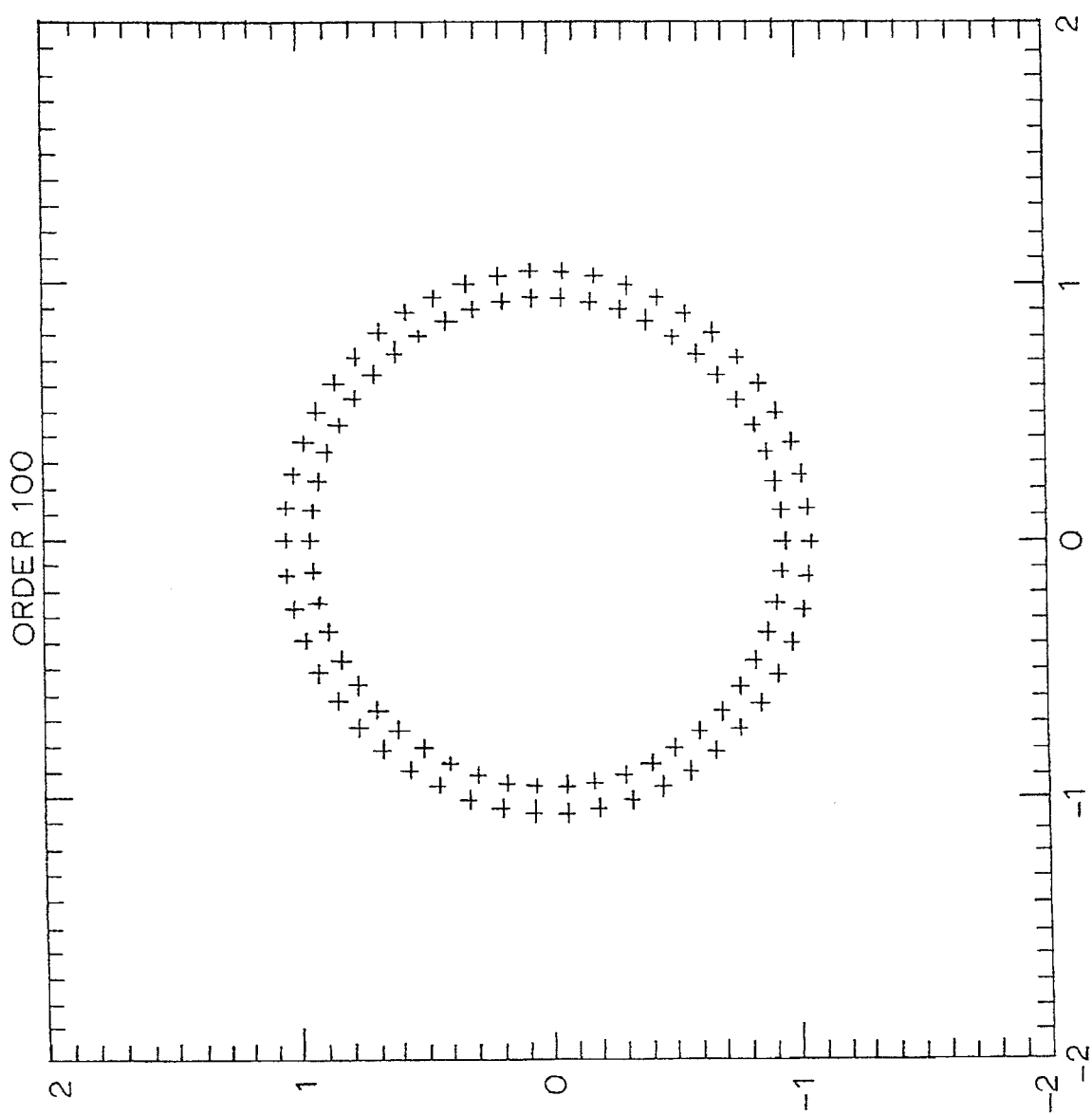
FIG. 7 is a graph of a unit circle for roots of a polynomial of order 100 which were determined by signal processing methods provided in accordance with the present invention.
Figure 8:
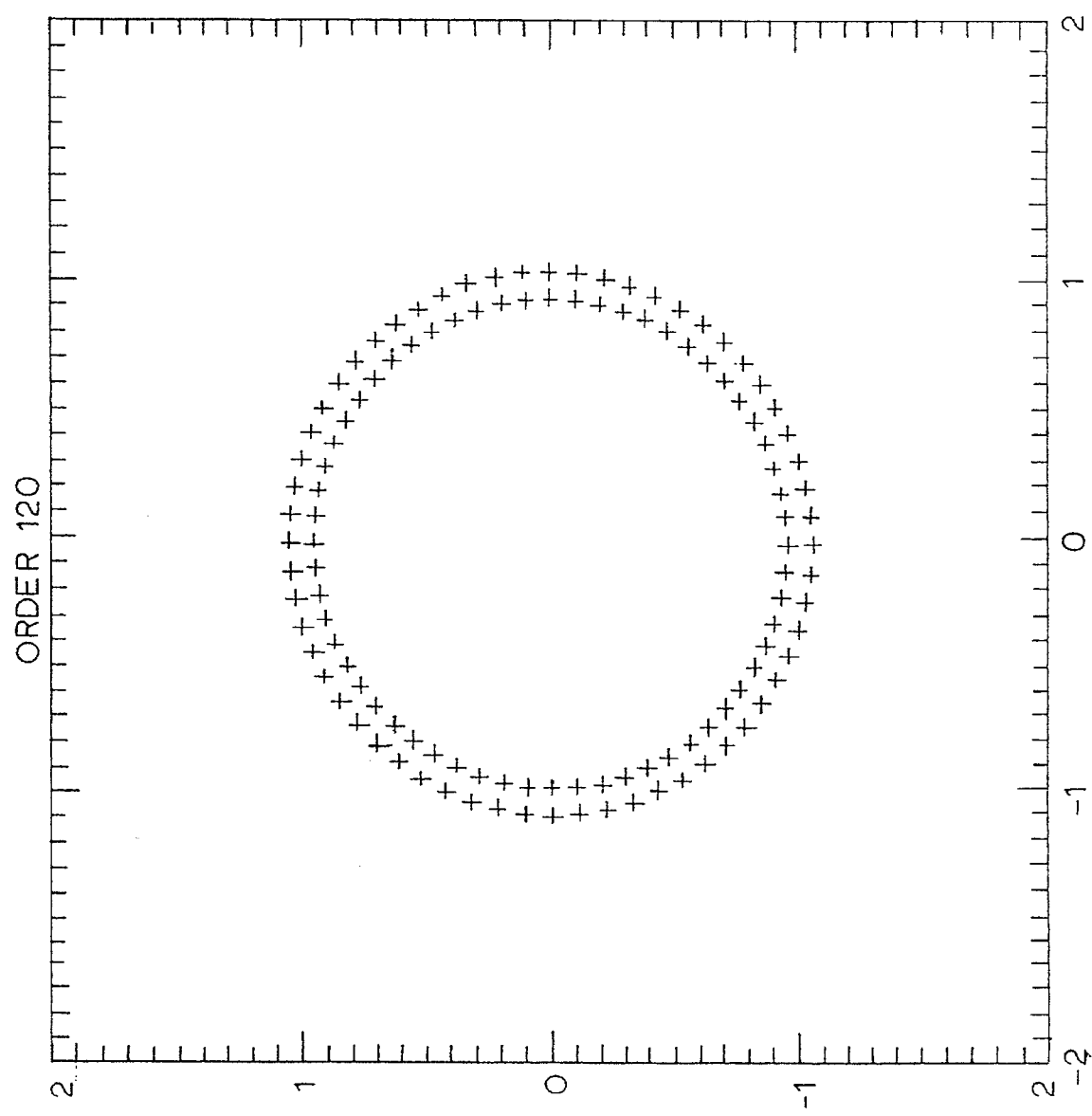
FIG. 8 is a graph of a unit circle for roots of a polynomial of order 120 which were determined by signal processing methods provided in accordance with the present invention.
Figure 9:
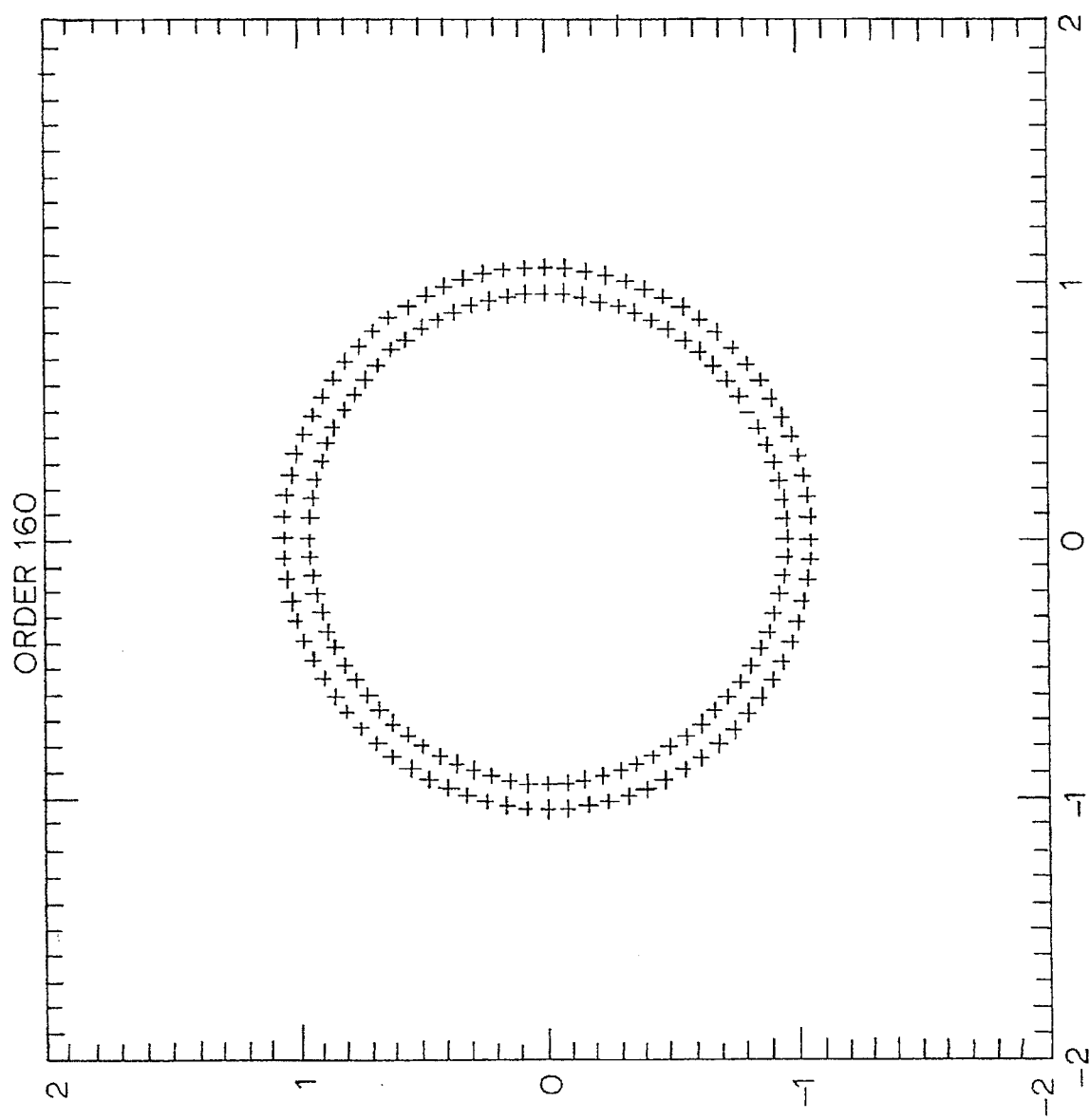
FIG. 9 is a graph of a unit circle for roots of a polynomial of order 160 which were determined by signal processing methods provided in accordance with the present invention.
Figure 10:
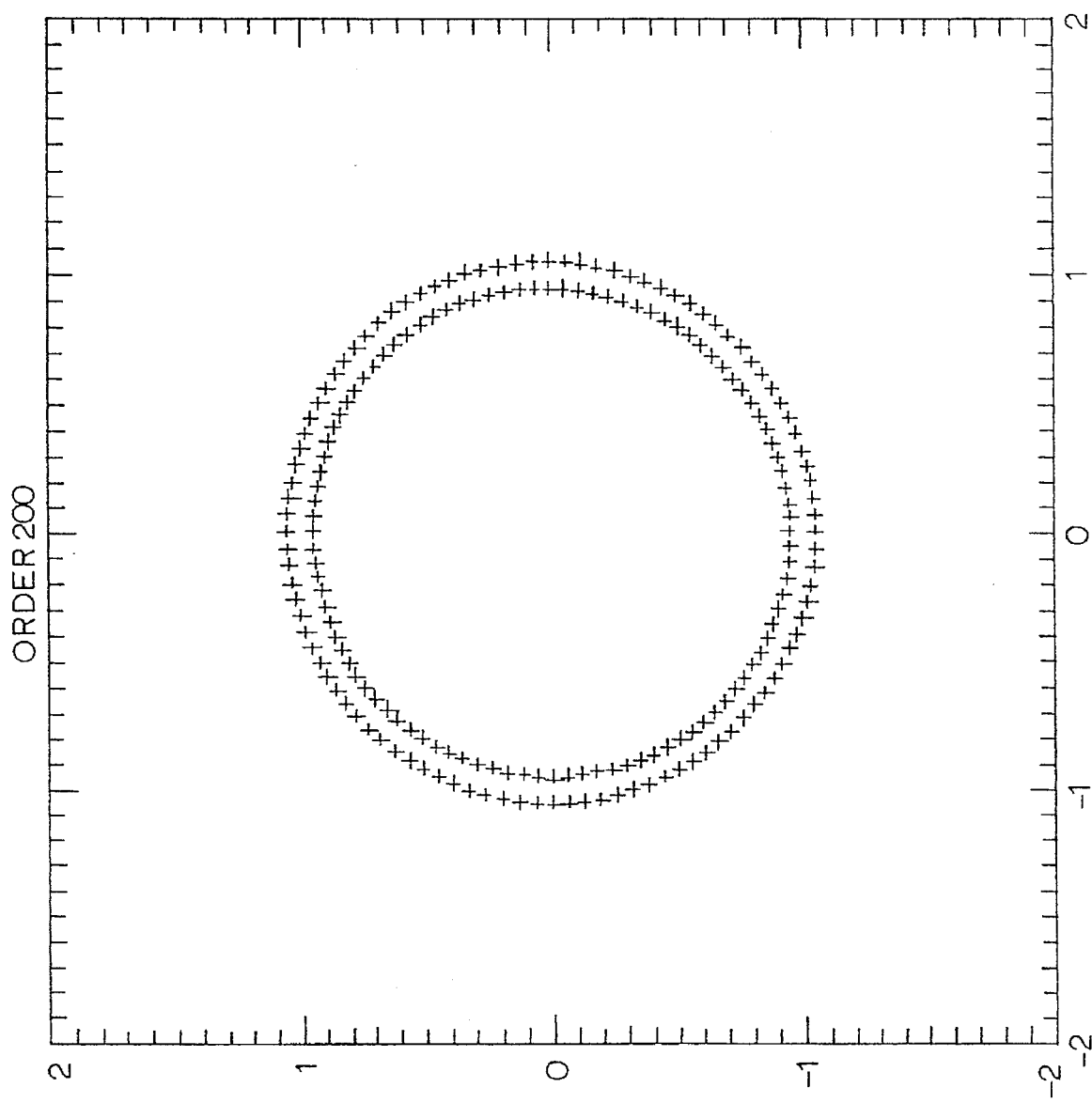
FIG. 10 is a graph of a unit circle for roots of a polynomial of order 200 determined by signal processing methods provided in accordance with the present invention.

FIGS. 7, 8, 9 and 10 show the results of root extraction from a polynomial with signal processing methods in accordance with the present invention for the same signal which was processed according to the CPOLY method shown in FIGS. 3, 4, 5 and 6 having sinusoidal components and white noise. Portions of the signal processing method were performed on the IBM 6000/320 digital computer with appropriate software which was designed to implement root extraction. FIG. 7 shows a unit circle for a polynomial having order 100, FIG. 8 shows a unit circle for a polynomial having order 120, FIG. 9 shows a unit circle for a polynomial having order 160, and FIG. 10 shows a unit circle for a polynomial having order 200.

As can be seen by the unit circles plotted in FIGS. 7, 8, 9 and 10, methods of signal processing provided in accordance with the present invention uniformly extract the roots of the polynomials without any breakdown in performance. The roots, shown again as crosses on the graphs, are all neatly extracted and plotted on the unit circle, wherein order 100 took approximately 0.69 seconds to process; order 120 took approximately 0.99 seconds to process; order 160 took approximately 1.83 seconds to process, and order 200 took approximately 2.82 seconds to process.

As can be further seen comparing orders 160 and 200 extracted in accordance with the present invention to the CPOLY method, a significant improvement in eigenvalue identification and root extraction is achieved so that signal processing in accordance with the present invention efficiently and accurately characterizes a signal's energy spectrum having a characteristic polynomial with a high order. These results have not heretofore been achieved in the art and evince a great advantage over standard numerical signal processing techniques which have previously been used.

As explained above, the time to process software which implements signal processing methods on digital computers greatly constrains the efficiency and usefulness of prior methods of signal processing. Thus the need to minimize computer processing time and inject efficiency in signal processing methods and systems creates a tension with the competing need to analyze complex signals and to extract roots from the high order polynomials which model these signals. Since high order polynomials are commonly found in almost all models of real world energy spectrums which signal processing methods must analyze, the problem of increasing computer processing time must be squarely addressed.

Figure 11:
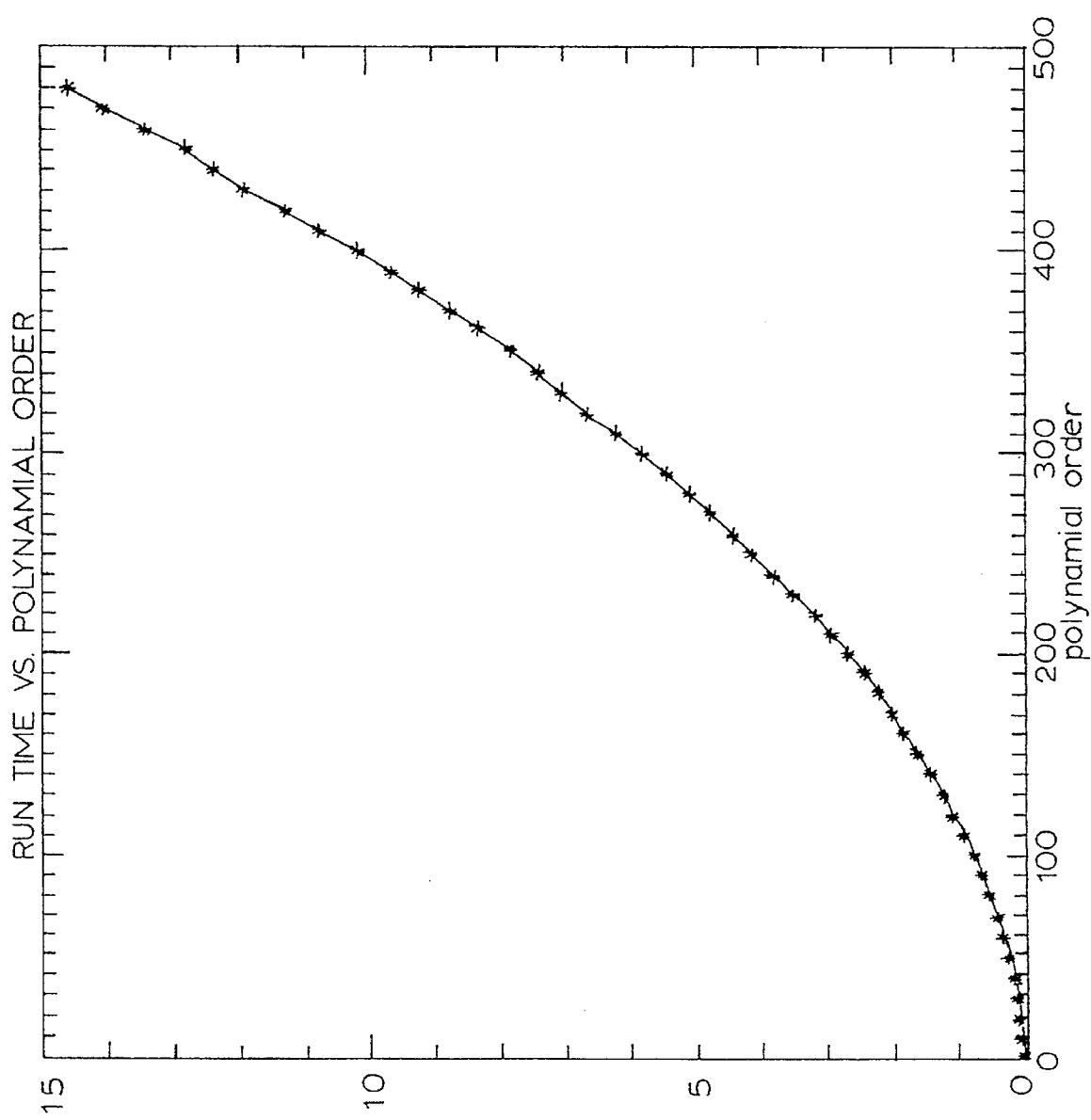
FIG. 11 is a graph of processing time versus polynomial order for extraction of polynomial roots with signal processing methods provided in accordance with the present invention.

Referring to FIG. 11, processing run time versus polynomial order for signal processing methods in accordance with the present invention as run on an IBM 6000/320 digital computer is plotted. At low orders, between 0 and 100 for example, processing time to extract the roots is less than about one second. At higher orders up to about 500, the processing time can take almost 15 seconds which is still significantly less time than prior methods would take, even if these prior methods could extract roots robustly.

At lower orders the signal processing methods provided in accordance with the present invention may take slightly longer than other methods such as the CPOLY root extractor. However at the higher orders, the present invention is much faster than anything presently available and indeed, is the only feasible signal processing method which may be implemented on a digital computer to provide root extraction and solutions to real world energy spectrums. Therefore systems and methods provided in accordance with the present invention solve a long-felt need in the art for versatile and fast signal processing methods which are implementable with digital computers.

Figure 12:
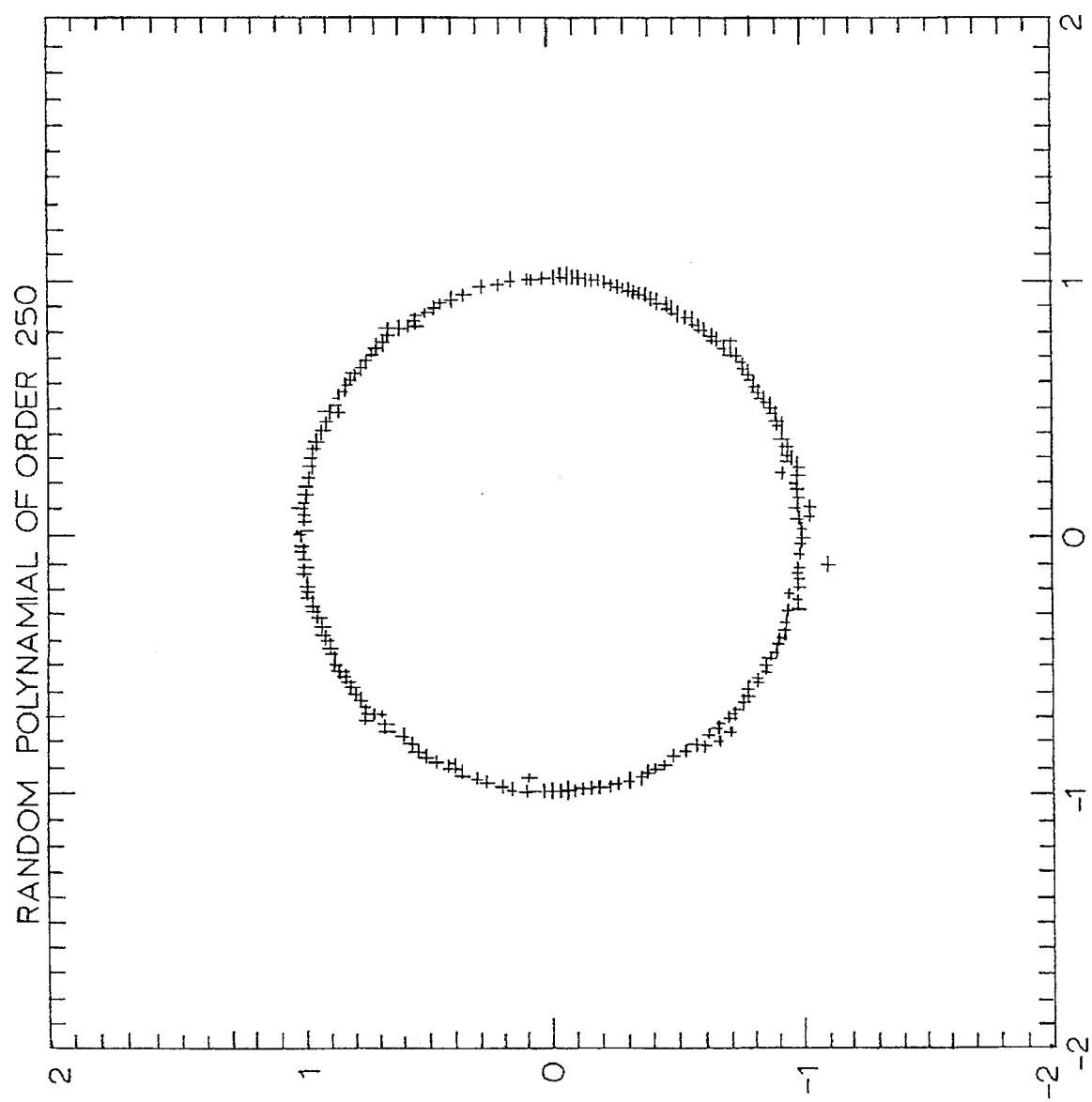
FIG. 12 is a graph of a unit circle for roots of a random polynomial of order 250 which were determined by methods of signal processing methods provided in accordance with the present invention.

For example, on a VAX 6310, the processing time, t, required to process energy spectrums with methods provided in accordance with the present inventions is approximately:

$$t = 0.68 \text{ msec} * n^2 \tag{15}$$

where n is greater than about 50. Most of the processing time, according to the present invention, is spent in the final diagonalization step. Furthermore, even with random polynomials having an order of about 250, root extraction according to the present invention is efficient and accurate as shown in the unit circle graph of FIG. 12.

As has been mentioned several times heretofore, portions of signal processing methods in accordance with the present invention are executable on a digital computer. Attached hereto before the claims is a preferred embodiment of a computer program which performs certain aspects of methods of signal processing taught and claimed herein. The computer program is written in FORTRAN and comprises a source code listing for portions of methods of signal processing herein described.

There have thus been described certain preferred embodiments of methods and apparatus for signal processing. While preferred embodiments have been described and disclosed, it will be recognized by those with skill in the art that modifications are within the true spirit and scope of the invention. The appended claims are intended to cover all such modifications.

APPENDIX

1. Contents of Package

| | |
|---|---|
| README | this file. |
| zroot.f | contains the subroutine ZROOT. ZROOT is the basic factorization procedure. |
| check.f | contains the subroutine ZCHECK and a main program which calls it. ZCHECK runs ZROOT through a test suite of synthetic polynomials with known roots. |
| out.1st | expected output from the installation test. |

2. Installation

The code is compliant with the ANSI X3.9-1978 standard, except the use of DOUBLE COMPLEX variables (2x64-bit) and its INTRINSIC functions ABS, DCMPLX, DREAL, and SQRT.

2.a. IBM RS/6000
```
xlf -c -O zroot.f
xlf zcheck.f zroot.o
a.out >out.1st
```

2.b. UNIX
```
f77 -c zroot.f (optimization switches O/S dependent)
f77 zcheck.f zroot.o
a.out >out.1st
```

2.c. VAX/VMS
```
FORTRAN ZCHECK.F+ZROOT.F
LINK ZCHECK
RUN ZCHECK
```

3. Verification

All test polynomials given in ZCHECK are factorizable by ZROOT. The message:
    ******** Only    xx roots out of    xx,
indicates that the installation has failed.

The root locations for some test polynomials may appear rather inaccurate. This is an indication that the polynomial function has a flat zero-crossing at this point. Check the residual for this cases. It should be small.

For roots with large moduli, the residual appears unreasonably high (many orders of magnitude.) In fact, ZROOT has calculated the correct root, but ZCHECK cannot evaluate the polynomial at this point with sufficient accuracy.

```
        SUBROUTINE ZROOT ( P, Z, NORDER, NROOTS)
C+
C       Finds the roots of a complex polynomial P(z).
C    The algorithm is designed to factor high-degree linear
C    prediction polynomials.  These are characterized by many
C    roots clustered in a narrow annulus around the unit
C    circle and have only a few isolated roots far away from
C    the unit circle.
C
C       Copyright, Manfred G. Prammer, 1989, 1990, 1991.
C
C   Method:
C       1. Find the trivial roots directly.
C       2. Scale the polynomial to move roots closer to the unit
C          circle.
C       3. Apply the modified Lanczos Algorithm to the companion
C          matrix.  The companion matrix has eigenvalues equal
C          to the polynomial's roots.
C       4. If Lanczos' algorithm looses orthogonality too early,
C          the disturbing (most prominent root) is identified
C          and removed before the restart.
C       5. Once the companion matrix is completely
C          tri-diagonalized, the complex tridiagonal QL algorithm
C          (CTQLI) extracts  all other roots.
C       6. The roots are de-scaled and returned to the calling
C          program.
C
C   Input:
C    P ...    NORDER+1 double precision complex coefficients.
C             P(1) is the highest-order coefficient, P(NORDER+1)
C             is the constant coefficient.  P(1) must not be zero.
C   NORDER..  polynomial order.  The algorithm attempts to find
C             NORDER roots.
C             In this implementation:  1 <= NORDER <= 500.
C
C   Output:
C    Z  ...   double precision complex roots.
C   NROOTS..  Number of roots actually found.
C
C   Certification:
C   The program ZCHECK can be used to verify an installation.
C   ZROOT has been tested on an IBM RS/6000 under AIX 3.1.5,
C   FORTRAN xlf V2.0, and under VAX/VMS using FORTRAN V4.4
C   and higher.  The program utilizes the DOUBLE COMPLEX
C   extensions of these compilers.
C
```

```
C   Parameters:
C       NDIM ... maximum polynomial order; set to 500 for this
C                implementation.  Can be increased up to 1000 for
C                some problems.
C       ETA  ... a small number.  Typically 1.D-12 for IEEE DOUBLE
C                PRECISION.
C-
        INTEGER           NORDER,NROOTS,NDIM,IA,IB,IM,I,J,K,M,N,ITN
        PARAMETER         (NDIM=500,IA=7141,IB=54773,IM=259200)
        DOUBLE PRECISION  ETA,ONE
        PARAMETER         (ETA=1.D-12,ONE=1.D0)
        DOUBLE COMPLEX        P(*),Z(*),A,B,F,G,H,PP,Q,S,FAC,DOT
     *                  ,   C(NDIM),D(NDIM),E(NDIM),R(NDIM),T(NDIM)
     *                  ,   V(NDIM), W(NDIM+1),X(NDIM),Y(NDIM)
     *                  ,   VO(NDIM),WO(NDIM+1)
        LOGICAL              RFLECT,PRTIAL C   initialize; store a monic polynomial in C(1:NORDER)
        WRITE (*,*) 'ZROOT Copyright, M. G. Prammer, 1989-1991'
        NROOTS=0
        IF ( NORDER .LE. 0 .OR. NORDER .GT. NDIM ) RETURN
        IF ( P(1) .EQ. (0,0) ) RETURN
        CALL ZMULT(ONE/P(1),P(2),C,NORDER)

C   restart point: N-residual polynomial order
10      N=NORDER-NROOTS
        IF (N .LE. 0 ) RETURN
C   sort out zero roots
        IF ( C(N) .EQ. (0,0) ) THEN
            NROOTS=NROOTS+1
            Z(NROOTS)=0
            N=N-1
            GOTO 10
        ENDIF
C   handle the trivial cases N=1 and N=2 directly
        IF ( N .EQ. 1 ) THEN
            NROOTS=NROOTS+1
            Z(NROOTS)= -C(1)
            RETURN
        ENDIF
        IF ( N .EQ. 2 ) THEN
            A= -C(1)/2
            B=SQRT( A*A-C(2) )
            Z(NROOTS+1)=A+B
            Z(NROOTS+2)=A-B
            NROOTS=NROOTS+2
```

```
            RETURN
         ENDIF
C   reflect polynomial if there are roots outside the unit
C   circle
         RFLECT= (ABS(C(N)) .GT. ONE )
         IF ( RFLECT ) THEN
            CALL ZCOPY(C,D,N)
            C(N)=ONE/C(N)
            DO 40   I=1,N-1
40             C(I)=D(N-I)*C(N)
         ENDIF
C   scale the roots such that their product (=C(N)) has modulus 1
         FAC= -LOG(ABS(C(N)))/N
         DO 50   I=1,N
50          C(I)=C(I)*EXP(I*DREAL(FAC))
         FAC=EXP(-DREAL(FAC))

C   create two independent(!) random vectors V and W, (V,W) = 1
         WRITE (*,*) 'Start of Lanczos iteration.  N=',N
         M=IB
         DO 70   I=1,N
            K=MOD(ONE*M*IA+IB,ONE*IM)
            M=MOD(ONE*K*IA=IB,ONE*IM)
            V(I)=2.*DCMPLX(K,M)/IM-DCMPLX(ONE,ONE)
            K=MOD(ONE*M*IA+IB,ONE*IM)
            M=MOD(ONE*K*IA+IB,ONE*IM)
            W(I)=2.*DCMPLX(K,M)/IM-DCMPLX(ONE,ONE)
70       CONTINUE
         A=ONE/SQRT(DOT(V,W,N))
         CALL ZMULT(A,V,V,N)
         CALL ZMULT(A,W,W,N)
         CALL ZCOPY(V,VO,N)
         CALL ZCOPY(W,WO,N)

C   Lanczos iteration
         PRTIAL=.FALSE.
         B=0.
         DO 80   K=1,N
            W(N+1)=0.
            X(1)= -DOT(C,V,N)-B*X(1)
            CALL ZAXPY(-B,X(2),V,X(2),N-1)
            CALL ZAXPY(-B,Y,W(2),Y,N)
            CALL ZAXPY(-W(1),C,Y,Y,N)
            A=0.5*(DOT(W,X,N)+DOT(V,Y,N))
C   store a new diagonal element D; exit loop at this point
            D(K)=A
```

```
              IF ( K .EQ. N ) GOTO 90
              CALL ZAXPY(-A,V,X,R,N)
              CALL ZAXPY(-A,W,Y,T,N)
              B=SQRT(DOT(R,T,N))
C   store a new sub-diagonal element E; escape if it vanishes
              E(K)=B
              IF ( ONE+ABS(DREAL(B))+ABS(DIMAG(B)) .EQ. ONE ) THEN
                  PRTIAL=.TRUE.
                  N=K-1
                  GOTO 90
              ENDIF
              CALL ZCOPY(V,X,N)
              CALL ZCOPY(W,Y,N)
              CALL ZMULT(ONE/B,R,V,N)
              CALL ZMULT(ONE/B,T,W,N)
C   initiate a partial eigenvalue decompos. if orthogonality has
C   been lost
              IF ( ABS(DOT(V,WO,N))+ABS(DOT(W,VO,N)) .GT. SQRT(ETA) )
     *        THEN
                  PRTIAL=.TRUE.
                  N=K-1
                  GOTO 90
              ENDIF
80        CONTINUE C   complex tridiagonal QL algorithm with implicit shifts (CTQLI)
90        IF ( N .LT. 2 ) RETURN
              WRITE (*,*) 'Start of CTQLI algorithm.  N=',N
              DO 150 K=1,N
                  ITN=30
100               DO 110 M=K,N-1
110                   IF ( ABS(DREAL(D(M)))  +ABS(DIMAG(D(M)))
     *                   + ABS(DREAL(D(M+1)))+ABS(DIMAG(D(M+1))) .GT.
     *                     (ABS(DREAL(E(M)))  +ABS(DIMAG(E(M))))/ETA )
                          GOTO 120
                  M=N
120               IF ( M .EQ. K ) GOTO 150
                  IF (ITN.LE. 0 ) RETURN
                  ITN=ITN-1
                  G=(D(K+1)-D(K))/(2.*E(K))
                  H=SQRT(G*G+ONE)
                  IF ( DREAL(G)*DREAL(H)+DIMAG(G)*DIMAG(H) .LT. 0 ) H= -H
                  G=D(M)-D(K)+E(K)/(G+H)
                  S=ONE
                  Q=ONE
                  PP=0.
```

```
              DO 140 I=M-1,K,-1
                  A=S*E(I)
                  B=Q*E(I)
                  IF ( ABS(A) .GE. ABS(G) ) THEN
                      Q=G/A
                      H=SQRT(Q*Q+ONE)
                      E(I+1)=A*H
                      S=ONE/H
                      Q=Q*S
                  ELSE
                      S=A/G
                      H=SQRT(S*S+ONE)
                      E(I+1)=G*H
                      Q=ONE/H
                      S=S*Q
                  ENDIF
                  G=D(I+1)-PP
                  H=(D(I)-G)*S+2.*Q*B
                  PP=S*H
                  D(I+1)=G+PP
                  G=Q*H-B
140           CONTINUE
              D(u)=D(u)-PP
                  E(K)=G
                  E(M)=0.
                  GOTO 100
150       CONTINUE

C     if only partial decomposition obtained; remove dominating
C     eigenvalue
          IF ( PRTIAL ) THEN
              A=0
              DO 160 I=1,N
                  IF ( ABS(D(I)) .GT. ABS(A) ) A=D(I)
160           CONTINUE
              A=FAC*A
              IF ( RFLECT ) A= ONE/A
              WRITE (*,*) 'Removing single root:',A
              NROOTS=NROOTS+1
              Z(NROOTS)=A
              C(1)=C(1)+A
              DO 170 I=2,NORDER
                  C(I)=C(I-1)*A+C(I)
                  IF ( ABS(C(I)) .LT. ETA ) C(I)=0
170           CONTINUE
              GOTO 10
```

```
            ENDIF

C   wrap-up after complete decomposition
        CALL ZMULT(FAC,D,D,N)
        IF ( RFLECT ) THEN
                DO 180  I=1,N
                    IF ( D(I).NE.(0,0) ) D(I)=ONE/D(I)
180             CONTINUE
        ENDIF
        DO 190 I=1,N
                NROOTS=NROOTS+1
                Z(NROOTS)=D(I)
190     CONTINUE
        RETURN
        END C   auxiliary subroutines and functions C   DOT--- DOT := (X,Y)
        DOUBLE COMPLEX FUNCTION DOT(X,Y,N)
        DOUBLE COMPLEX X(*),Y(*),S
        INTEGER I,N
        S=0
        DO 10 I=1,N
10              S=S+X(I)*Y(I)
        DOT=S
        END
C   ZAXPY--- Z := A*X+Y ( there is an equivalent in BLAS)
        SUBROUTINE ZAXPY(A,X,Y,Z,N)
        DOUBLE COMPLEX A,X(*),Y(*),Z(*)
        INTEGER I,N
        DO 10 I=1,N
10          Z(I)=A*X(I)+Y(I)
        END
C   ZMULT--- Z : A*X
        SUBROUTINE ZMULT(A,X,Z,N)
        DOUBLE COMPLEX A,X(*),Z(*)
        INTEGER I,N
        DO 10 I=1,N
10          Z(I)=A*X(I)
        END
C   ZCOPY--- Z := X
        SUBROUTINE ZCOPY(X,Z,N)
        DOUBLE COMPLEX X(*),Z(*)
        INTEGER I,N
        DO 10 I=1,N
```

```
10        Z(I)=X(I)
          END
          SUBROUTINE ZCHECK
C+
C   Verifies the installation of root solver ZROOT.
C-
          INTEGER              NDIM,I,N,NROOTS
          PARAMETER            (NDIM=500)
          DOUBLE COMPLEX       P(NDIM+1),Z(NDIM),EVAL C   simple test: (-1-j), 0, 0; must be caught in initialization
          N=3
          WRITE (*,*) 'Check #1: (-1-j), 0, & 0. n=',N
          CALL ZCLEAR(P,N)
          P(1)=1
          P(2)=(1,1)
          CALL ZROOT(P,Z,N,NROOTS)
          CALL PRINT(P,Z,N,NROOTS)

C   simple test: j, -j & 0; must be caught in initialization
          N=3
          WRITE (*,*) 'Check #2: j, -j & 0. N=',N
          CALL ZCLEAR(P,N)
          P(1)=1
          P(3)=1
          CALL ZROOT(P,Z,N,NROOTS)
          CALL PRINT(P,Z,N,NROOTS)

C   low orders: 1,2,3,4,5,6
          N=6
          WRITE (*,*) 'Check #3: 1,2,3,4,5,6'
          CALL ZCLEAR(P,N)
          P(1)=                 1
          P(2)=               -21
          P(3)=               175
          P(4)=              -735
          P(5)=              1624
          P(6)=             -1764
          P(7)               720
          CALL ZROOT(P,Z,N,NROOTS)
          CALL PRINT(P,Z,N,NROOTS)

C   range test: 10e-3, 1, 10e3
          N=3
          WRITE (*,*) 'Check #4: range test: 0.001, 1, & 1000, N=',N
          P(1)=            1.D0
```

```
      P(2)= -1001.001D0
      P(3)=  1001.001D0
      P(4)=         -1.D0
      CALL ZROOT(P,Z,N,NROOTS)
      CALL PRINT(P,Z,N,NROOTS)

C   can we find the unit roots at maximum order?
      N=NDIM
      WRITE (*,*) 'Check #5: unit roots. N=',N
      CALL ZCLEAR(P,N)
      P(1)=1
      P(N+1)=1
      CALL ZROOT(P,Z,N,NROOTS)
      CALL PRINT(P,Z,N,NROOTS)

C   this test generates a very small constant (10e-30): is scaling
C   working?
      N=120
      WRITE (*,*) 'Check #6: scaling test: 0.495 & 0.505 circles. N=',N
      CALL ZCLEAR(P,N)
      P(1)=1
      P(N/2+1)= 0.495**(N/2) + 0.505**(N/2)
      P(N+1)= (0.495*0.505)**(N/2)
      CALL ZROOT(P,Z,N,NROOTS)
      CALL PRINT(P,Z,N,NROOTS)

C   unit roots & one isolated root at +10
      N=361
      WRITE (*,*) 'Check #7: unit roots (+10). N=', N
      CALL ZCLEAR(P,N)
      P(1)=        1
      P(2)=      -10
      P(N)=       -1
      P(N+1)=     10
      CALL ZROOT(P,Z,N,NROOTS)
      CALL PRINT(P,Z,N,NROOTS)

C   unit roots & one isolated root at +0.5
      N=361
      WRITE (*,*) 'Check #8: unit roots & (+0.5). N=',N
      CALL ZCLEAR(P,N)
      P(1)=        2
      P(2)=       -1
      P(N)        -2
      P(N+1)=      1
      CALL ZROOT(P,Z,N,NROOTS)
```

```
           CALL PRINT(P,Z,N,NROOTS)

C    unit roots & (2.0) & (-0.5)
           N=362
           WRITE (*,*) 'Check #9: 360 unit roots + (-0.5) + (2.0)'
           CALL ZCLEAR(P,N)
           P(1)=         1
           P(2)=       -3./2.
           P(3)=        -1
           P(N-1)=      -1
           P(N)=        3./2.
           P(N+1)=       1
           CALL ZROOT(P,Z,N,NROOTS)
           CALL PRINT(P,Z,N,NROOTS)

WRITE (*,*) '-------- end of ZCHECK --------'
           END

SUBROUTINE ZCLEAR(P,N)
           DOUBLE COMPLEX P(*)
           INTEGER I,N
           DO 10 I=1,N+1
10             P(I)=(0,0)
           END

SUBROUTINE PRINT(P,Z,N,NROOTS)
           DOUBLE COMPLEX P(*),Z(*),D,EVAL
           DOUBLE PRECISION A,B,C
           INTEGER I,N,NROOTS
           IF ( N .NE. NROOTS ) WRITE(*,*)'***** Only',NROOTS,' roots out of ',N
           WRITE (*,*) 'root moduli, root args(degrees), and estim. residuals:'
           DO 10 I+1,N
               A=0
               B=0
               C=0
               IF ( Z(I) .NE. (0,0) ) THEN
                   A=ABS(Z(I))
                   B=ATAN2(DIMAG(Z(I)),DREAL(Z(I)))*45.D0/ATAN(1.D0)
               ENDIF
                   D=EVAL(P,Z(I),N)
                   IF ( D .NE. (0,0) )  C=ABS(D)
                   WRITE (*,*) A,B,C
10         CONTINUE
           WRITE (*,*)
           END
```

```
        DOUBLE COMPLEX FUNCTION EVAL(P,Z,N)
        DOUBLE COMPLEX P(*),Z,T
        INTEGER I,N
        T=P(1)
        DO 10 I=2,N+1
10          T=T*Z+P(I)
        EVAL=T
        END

C********* main program **********
        CALL ZCHECK
```

What is claimed is:

1. A method of analyzing a signal gathered from a signal source wherein the signal is composed of at least one signal of interest and random noise signals comprising the steps of:

storing a digital representation of the signal in the digital memory of digital computer;

constructing a polynomial expression of the signal with the digital computer;

constructing from the polynomial expression a matrix having an order, n, wherein the polynomial expression is substantially the characteristic polynomial of the matrix and the matrix has associated therewith at least one eigenvalue which is a root value of the characteristic polynomial;

tridiagonalizing the matrix to obtain a tridiagonalized matrix having the same eigenvalues as the matrix wherein computer processing time to tridiagonalize the matrix is proportional substantially to about $n^2$; and gathering the signal from the signal source with a detector having a sensitivity such that the detector is responsive to the signal gathered from the signal source.

2. The method recited in claim 1 wherein the step of constructing from the polynomial expression a matrix further comprises the steps of minimizing the matrix to produce a minimized matrix such that extraction of the eigenvalues from the minimized matrix is accomplished in a minimized time proportional substantially to about $n^2$.

3. The method recited in claim 2 wherein the tridiagonalizing step further comprises the step of finally diagonalizing the minimized matrix to produce a triangular matrix having elements which are roots of the polynomial.

4. The method recited in claim 3 further comprising the step of extracting the eigenvalues from the triangular matrix, thereby characterizing the polynomial from the digital representation of the signal to identify the signal source.

5. The method recited in claim 4 wherein the order n is greater than about 50, and the processing time follows substantially the relationship:

$$t = 0.68 \text{ msec} * n^2.$$

6. The method of identifying an object emitting a spectrum of energy comprising the steps of:

gathering the energy spectrum with a detecting element, said detecting element having a sensitivity such that the detecting element is responsive to the energy spectrum;

digitizing the energy spectrum to obtain a digitized form of the energy spectrum and storing the digitized form in a digital memory;

approximating the digitized form of the energy spectrum to a characteristic polynomial of a matrix having associated therewith at least one eigenvalue;

minimizing the matrix to produce a minimized matrix such that extraction of the eigenvalues from the minimized matrix is accomplished in a minimized time which is less than a time of extraction of the eigenvalues from the matrix; and processing the extracted eigenvalues using a digital computer to adequately characterize the approximated digitized form of the energy spectrum, thereby identifying the object which emitted the energy spectrum.

7. The method recited in claim 6 wherein the characteristic polynomial has an order, n, associated with the characteristic polynomial.

8. The method recited in claim 7 wherein the matrix is an n×n matrix.

9. The method recited in claim 8 wherein the minimizing steps further comprises the steps of:

tridiagonalizing the matrix to produce the minimized matrix; and diagonalizing finally the tridiagonalized matrix so that the elements of the tridiagonalized matrix are the eigenvalues of the minimized matrix and the matrix.

10. The method recited in claim 9 wherein the minimized time is proportional substantially to about $n^2$.

11. The method recited in claim 10 wherein n is greater than about 50 and the minimized time follows substantially the following relationship:

$$t = 0.68 \text{ msec} * n^2.$$

12. An apparatus for analyzing an energy spectrum emitted by an object to determine the identification of that object wherein the energy spectrum is composed of at least one signal of interest and random noise signals comprising:

means for detecting said signals of said energy spectrum;

means for conditioning said signals to produce conditioned signals wherein said conditioning means is operatively connected to said detecting means; and processing means for processing said the conditioned signals to identify the object from the conditioned signals, the processing means further comprising, approximation means for approximating the conditioned signals to a characteristic polynomial of a matrix having associated therewith at least one eigenvalue, and minimization means interfaced with the approximation means for minimizing the matrix to produce a minimized matrix such that extraction of the eigenvalues from the minimized matrix is accomplished in a minimized time which is less than a time of extraction of the eigenvalues from the matrix.

13. The apparatus system recited in claim 12 wherein the data gathering means is a detecting element having a sensitivity such that the detecting element is responsive to a signal emitted by the object which is to be identified by the system.

14. The apparatus system recited in claim 13 wherein the processing means is a digital computer.

15. The apparatus system recited in claim 14 wherein the approximation means produces the characteristic polynomial having an order, n, and the matrix is an n×n matrix.

16. The apparatus system recited in claim 15 wherein the minimization means minimizes the matrix by tridiagonalizing the matrix such that the tridiagonalized matrix has the same eigenvalues as the matrix.

17. The apparatus system recited in claim 16 wherein the minimization means further finally diagonalizes the matrix such that the elements of the finally diagonalized matrix are the eigenvalues of the matrix.

18. The apparatus system recited in claim 17 wherein the minimized time is proportional substantially to about $n^2$.

19. The apparatus system recited in claim 18 wherein the order, n, is greater than about 50 and the minimized time follows substantially the relationship:

$$t = 0.68 \text{ msec} * n^2.$$

20. The apparatus system recited in claim 19 further comprising output means interfaced with the minimization means for finally characterizing the characteristic polynomials and the eigenvalues to identify the object which emitted the signal.

21. The apparatus system recited in claim 12 wherein the conditioning means is a digital to analog converter which converts the signal gathered by the data gathering means to a digital representation of the signal which is usable by the processing means.

* * * * *